United States Patent
Nishizaki

(10) Patent No.: US 10,108,834 B2
(45) Date of Patent: Oct. 23, 2018

(54) METHOD AND DEVICE FOR GENERATING TWO-DIMENSIONAL BARCODE, PROGRAM, TWO-DIMENSIONAL BARCODE, AND METHOD AND DEVICE FOR READING TWO-DIMENSIONAL BARCODE

(71) Applicant: TOPPAN TDK LABEL CO., LTD., Tokyo (JP)

(72) Inventor: Tsutao Nishizaki, Kawasaki (JP)

(73) Assignee: TOPPAN TDK LABEL CO., LTD., Tokyo (JP)

( * ) Notice: Subject to any disclaimer, the term of this patent is extended or adjusted under 35 U.S.C. 154(b) by 0 days.

(21) Appl. No.: 15/519,251

(22) PCT Filed: May 19, 2015

(86) PCT No.: PCT/JP2015/064338
§ 371 (c)(1),
(2) Date: Apr. 14, 2017

(87) PCT Pub. No.: WO2016/059822
PCT Pub. Date: Apr. 21, 2016

(65) Prior Publication Data
US 2017/0235989 A1    Aug. 17, 2017

(30) Foreign Application Priority Data

Oct. 15, 2014   (JP) .................. 2014-210825

(51) Int. Cl.
*G06K 7/10* (2006.01)
*G06K 7/14* (2006.01)
*G06K 19/06* (2006.01)

(52) U.S. Cl.
CPC ..... *G06K 7/1417* (2013.01); *G06K 19/06037* (2013.01)

(58) Field of Classification Search
CPC .......... G06K 19/06037; G06K 7/1417; G06K 19/06046; G06K 19/06075; G06K 7/1473; G06K 9/00577
(Continued)

(56) References Cited

U.S. PATENT DOCUMENTS 5,896,403 A * 4/1999 Nagasaki .......... G06F 17/30017
                                                    369/14
9,672,623 B2 * 6/2017 Ghazizadeh ............. G06T 7/80
(Continued)

FOREIGN PATENT DOCUMENTS

CN     103377442 A    10/2013
EP      3065088 A1     9/2016
(Continued)

OTHER PUBLICATIONS

International Search Report for PCT/JP2015/064338, ISA/JP, Tokyo, dated Aug. 18, 2015, with English translation thereof.
(Continued)

*Primary Examiner* — Thien M Le
(74) *Attorney, Agent, or Firm* — Harness, Dickey & Pierce, P.L.C.

(57) ABSTRACT

A method for generating a two-dimensional barcode, including: obtaining a protection-encoding pattern based on a mask pattern reference, the mask pattern reference being a reference for identifying a mask pattern that is applied to a module group, the module group being composed of a plurality of modules, each module being a unit cell constituting the two-dimensional barcode; obtaining a protection-encoded code block by protection-encoding a code block with the protection-encoding pattern, the code block having at least a data codeword; generating the module group based
(Continued)

on the protection-encoded code block; and generating the two-dimensional barcode having the module group to which the mask pattern is applied.

19 Claims, 35 Drawing Sheets

(58) Field of Classification Search
USPC .................................................. 235/462.1
See application file for complete search history.

(56) References Cited

U.S. PATENT DOCUMENTS

| | | | |
|---|---|---|---|
| 9,858,518 B2* | 1/2018 | Nishizaki | G06K 19/06075 |
| 2005/0147372 A1* | 7/2005 | Bourdelais | G01D 5/34723 |
| | | | 385/129 |
| 2009/0212111 A1 | 8/2009 | Krichi et al. | |
| 2011/0079639 A1* | 4/2011 | Khan | H04N 1/00326 |
| | | | 235/375 |
| 2014/0098243 A1* | 4/2014 | Ghazizadeh | G06T 7/0018 |
| | | | 348/187 |
| 2014/0119511 A1* | 5/2014 | Ward | G01N 23/20 |
| | | | 378/71 |
| 2016/0267370 A1* | 9/2016 | Nishizaki | G06K 7/1417 |
| 2017/0124442 A1* | 5/2017 | Nishizaki | G06K 19/06056 |

FOREIGN PATENT DOCUMENTS

| | | |
|---|---|---|
| JP | 2009-093443 A | 4/2009 |
| JP | 2009-163720 A | 7/2009 |
| JP | 2012-089177 A | 5/2012 |
| JP | 2013-025475 A | 2/2013 |
| JP | 2014-029659 A | 2/2014 |

OTHER PUBLICATIONS

Written Opinion of the ISA for PCT/JP2015/064338, ISA/JP, Tokyo, dated Aug. 18, 2015.
Masaki Kuramoto et al., "Secret Sharing Scheme in QR Code Considering the Size of Shares", IEICE Technical Report, Sep. 5, 2013 (Sep. 5, 2013), vol. 113, No. 212.
Extended European Search Report in parallel application EP 15851333.3, EPO, Munich, dated May 22, 2018.

* cited by examiner

FIG. 17

METHOD AND DEVICE FOR GENERATING TWO-DIMENSIONAL BARCODE, PROGRAM, TWO-DIMENSIONAL BARCODE, AND METHOD AND DEVICE FOR READING TWO-DIMENSIONAL BARCODE

CROSS-REFERENCE TO RELATED APPLICATIONS

This application is a 371 U.S. National Stage of International Application No. PCT/JP2015/064338, filed on May 19, 2015, which claims priority to and the benefit of Japanese Patent Application No. 2014-210825, filed Oct. 15, 2014. The entire disclosures of the above applications are incorporated herein by reference.

TECHNICAL FIELD

The invention relates to a method and a device for generating a two-dimensional barcode, a program, a two-dimensional barcode, and a method and a device for reading a two-dimensional barcode.

As a technique of a two-dimensional (2D) barcode, by which a graphic code is read and information contained in the code is retrieved, there is Japanese Industrial Standards (JIS) X 0510:2004 "Two dimensional symbol—QR code—". In addition, a technique for concealing hiding-object information (which is not information to be displayed) into such a 2D barcode is developed.

Patent Literature 1 discloses a two-dimensional barcode in which a key code pattern are recorded in a superposing manner in at least either one of data codewords or error correction codewords, the key code pattern being for decrypting encrypted data contained in the data codewords.

CITATION LIST

Patent Literature

[Patent Literature 1] Japanese Unexamined Patent Application Publication No. 2009-93443

SUMMARY OF INVENTION

Technical Problem

The method according to Patent Literature 1 has a problem that superposing a key code pattern on light modules and dark modules makes it easier to identify the key code pattern. If a key code pattern is identified, there is a possibility that encrypted data contained in the data codewords is decrypted. Thus, there is a demand to protect data contained in a two-dimensional barcode more appropriately.

An aspect of the invention is to protect data contained in a two-dimensional barcode more appropriately.

Solution to Problem

In order to achieve the above advantage, a method for generating a two-dimensional barcode according to the invention includes:
obtaining a protection-encoding pattern based on a mask pattern reference,
the mask pattern reference being a reference for identifying a mask pattern that is applied to a module group,
the module group being composed of a plurality of modules,
each module being a unit cell constituting the two-dimensional barcode;
obtaining a protection-encoded code block by protection-encoding a code block with the protection-encoding pattern,
the code block having at least a data codeword;
generating the module group based on the protection-encoded code block; and
generating a two-dimensional barcode having the module group to which the mask pattern is applied.

In order to achieve the above advantage, a device for generating a two-dimensional barcode according to the invention, includes:
an encoder in which:
a protection-encoding pattern is obtained based on a mask pattern reference,
the mask pattern reference being a reference for identifying a mask pattern that is applied to a module group,
the module group being composed of a plurality of modules,
each module being a unit cell constituting the two-dimensional barcode;
a protection-encoded code block is obtained by protection-encoding a code block with the protection-encoding pattern,
the code block having at least a data codeword;
the module group is generated based on the protection-encoded code block; and
the two-dimensional barcode having the module group to which the mask pattern is applied is generated.

In order to achieve the above advantage, a program according to the invention causing a computer to perform the following processes:
obtaining a protection-encoding pattern based on a mask pattern reference,
the mask pattern reference being a reference for identifying a mask pattern that is applied to a module group,
the module group being composed of a plurality of modules each of which is a unit cell constituting a two-dimensional barcode;
obtaining a protection-encoded code block by protection-encoding a code block with the protection-encoding pattern,
the code block having at least a data codeword;
generating the module group based on the protection-encoded code block; and
generating a two-dimensional barcode having the module group to which the mask pattern is applied.

In order to achieve the above advantage, a two-dimensional barcode according to the invention characterized in that:
a protection-encoding pattern is obtained based on a mask pattern reference,
the mask pattern reference being a reference for identifying a mask pattern that is applied to a module group,
the module group being composed of a plurality of modules,
each module being a unit cell constituting the two-dimensional barcode;

a protection-encoded code block is obtained by protection-encoding a code block with the protection-encoding pattern, the code block having at least a data codeword;

the module group is generated based on the protection-encoded code block; and the two-dimensional barcode having the module group to which the mask pattern is applied is generated.

In order to achieve the above advantage, a method for reading a two-dimensional barcode according to the invention includes:

reading a two-dimensional barcode,
the two-dimensional barcode being generated by the following steps:
obtaining a protection-encoding pattern based on a mask pattern reference,
the mask pattern reference being a reference for identifying a mask pattern that is applied to a module group,
the module group being composed of a plurality of modules,
each module being a unit cell constituting the two-dimensional barcode;
obtaining a protection-encoded code block by protection-encoding a code block with the protection-encoding pattern,
the code block having at least a data codeword;
generating the module group based on the protection-encoded code block; and
applying the mask pattern to the module group;
extracting the mask pattern reference that is contained in the two-dimensional barcode;
obtaining the module group by unmasking the two-dimensional barcode using the mask pattern that is identified by the mask pattern reference;
obtaining the protection-encoded code block from the module group;
obtaining the code block by protection-decoding the protection-encoded code block using the protection-encoding pattern that is obtained based on the mask pattern reference; and
extracting the data codeword from the code block.

In order to achieve the above advantage, a device for reading a two-dimensional barcode according to the invention includes:

a decoder in which:
a two-dimensional barcode is read,
the two-dimensional barcode being generated by the following steps:
obtaining a protection-encoding pattern based on a mask pattern reference,
the mask pattern reference being a reference for identifying a mask pattern that is applied to a module group,
the module group being composed of a plurality of modules,
each module being a unit cell constituting the two-dimensional barcode;
obtaining a protection-encoded code block by protection-encoding a code block with the protection-encoding pattern,
the code block having at least a data codeword;
generating the module group based on the protection-encoded code block; and
applying the mask pattern to the module group;
the mask pattern reference contained in the two-dimensional barcode is extracted;
the module group is obtained by unmasking the two-dimensional barcode using the mask pattern that is identified by the mask pattern reference;
the protection-encoded code block is obtained from the module group;
the code block is obtained by protection-decoding the protection-encoded code block using the protection-encoding pattern that is obtained based on the mask pattern reference; and
the data codeword is extracted from the code block.

In order to achieve the above advantage, a program according to the invention causing a computer to perform the following processes:

reading a two-dimensional barcode,
the two-dimensional barcode being generated by the following steps:
obtaining a protection-encoding pattern based on a mask pattern reference,
the mask pattern reference being a reference for identifying a mask pattern that is applied to a module group,
the module group being composed of a plurality of modules,
each module being a unit cell constituting the two-dimensional barcode;
obtaining a protection-encoded code block by protection-encoding a code block with the protection-encoding pattern,
the code block having at least a data codeword;
generating the module group based on the protection-encoded code block; and
applying the mask pattern to the module group;
extracting the mask pattern reference that is contained in the two-dimensional barcode;
obtaining the module group by unmasking the two-dimensional barcode using the mask pattern that is identified by the mask pattern reference;
obtaining the protection-encoded code block from the module group;
obtaining the code block by protection-decoding the protection-encoded code block using the protection-encoding pattern that is obtained based on the mask pattern reference; and
extracting the data codeword from the code block.

Advantageous Effects of Invention

According to the invention, in order to obtain a protection-encoding pattern, used is a mask pattern reference identifying a mask pattern that is applied to a module group. The mask pattern reference is composed of a plurality of modules each module being a unit cell constituting a two-dimensional barcode. If there are a plurality of the mask patterns, a plurality of the mask pattern references exist. Accordingly, depending on the mask pattern to be applied, it is possible to change a protection-encoding pattern to be applied. Consequently, it is difficult for a third party to identify the protection-encoding pattern. This makes it possible to protect data (data codewords) contained in the two-dimensional barcode more appropriately.

BRIEF DESCRIPTION OF DRAWINGS

FIG. 17 is a diagram illustrating a method for reading-out original data.

DESCRIPTION OF EMBODIMENTS

Figure 1:
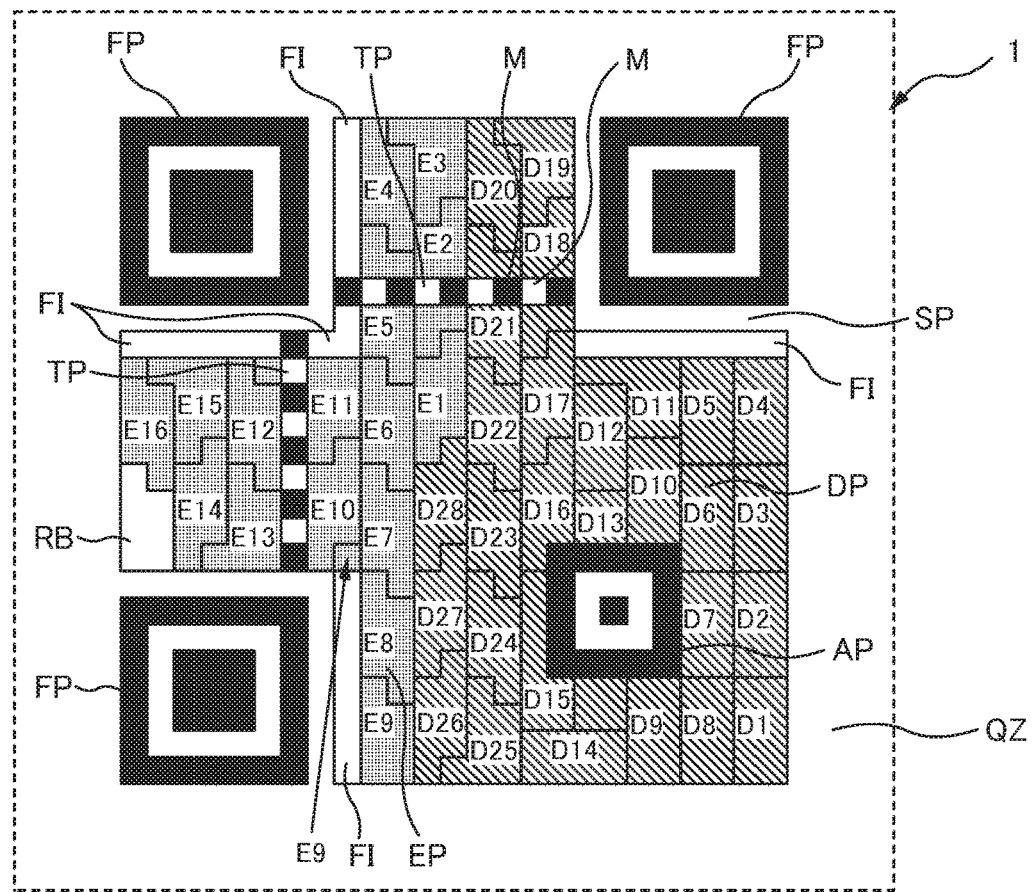
FIG. 1 is a diagram illustrating a QR code symbol 1.

With the description and the accompanied drawings, at least the following matters will be apparent.

A method for generating a two-dimensional barcode, including:

obtaining a protection-encoding pattern based on a mask pattern reference,
the mask pattern reference being a reference for identifying a mask pattern that is applied to a module group,
the module group being composed of a plurality of modules,
each module being a unit cell constituting the two-dimensional barcode;
obtaining a protection-encoded code block by protection-encoding a code block with the protection-encoding pattern,
the code block having at least a data codeword;
generating the module group based on the protection-encoded code block; and
generating a two-dimensional barcode having the module group to which the mask pattern is applied.

With such a method for generating a two-dimensional barcode, the mask pattern reference identifying the mask pattern that is applied to the module group is used for obtaining the protection-encoding pattern. If there are a plurality of the mask patterns, a plurality of the mask pattern references exist. Accordingly, depending on the mask pattern to be applied, it is possible to change a protection-encoding pattern to be applied. Consequently, it is difficult for a third party to identify the protection-encoding pattern. This makes it possible to protect data (data codewords) contained in the two-dimensional barcode more appropriately.

In such a method for generating a two-dimensional barcode, it is preferable that the method further comprises: using different mask pattern references to generate a plurality of the two-dimensional barcodes; and selecting a certain two-dimensional barcode among the plurality of two-dimensional barcodes based on a predetermined evaluation.

With such a method for generating a two-dimensional barcode, until a certain evaluation is conducted on all of the two-dimensional barcodes generated using different mask pattern references, which of the two-dimensional barcodes to which the protection-encoding pattern has been applied is the optimal two-dimensional barcode cannot be determined. Accordingly, the protection-encoding pattern cannot be decided in advance. This can make it more difficult to identify the protection-encoding pattern. Consequently, it is possible to protect data contained in the two-dimensional barcode more appropriately.

In such a method for generating a two-dimensional barcode, it is preferable that the protection-encoding is a step of XORing the code block with the protection-encoding pattern on a bit-by-bit basis.

With such a method, both of protection-encoding and protection-decoding can be performed by XORing a code block with a protection-encoding pattern. That is, both of protection-encoding and protection-decoding can be made by the same type of processing.

In such a method for generating a two-dimensional barcode, it is preferable that the two-dimensional barcode is a QR code, and the mask pattern reference is contained in format information of the QR code.

The format information of the QR code is not masked by the mask pattern according to JIS. Accordingly, when a QR code is read, it is possible to appropriately read the mask pattern reference, which is contained in the format information. Using a predetermined mask pattern identified by the mask pattern reference, masking can be removed.

In such a method for generating a two-dimensional barcode, it is preferable that the code block contains a correction code that corrects the code block, the protection-encoding pattern is obtained based on the mask pattern reference and one other reference, a part of the protection-encoded code block is replaced with the other reference, and a correcting capacity of the correction code is equal to or more than a number of words of the other reference.

With such a method, it is possible to obtain the protection-encoding pattern using the other reference. This can make it more difficult to identify the protection-encoding pattern. The other reference is used for replacing a part of the protection-encoded code block, and correction is appropriately made using the correction code after the replacement. Accordingly, this makes it more difficult to identify the protection-encoding pattern, and simultaneously makes it possible to extract data appropriately.

In such a method for generating a two-dimensional barcode, it is preferable that a position which has been replaced with the other reference is identified based on the mask pattern reference.

With such a method, the position which has been replaced with the other reference can be changed based on the mask pattern reference. Accordingly, even if changing the position which has been replaced, it is possible to identify the position appropriately based on the mask pattern reference.

In such a method for generating a two-dimensional barcode, it is preferable that when the code block is partly replaced with one other reference, at least a part of the code block is replaced with a closed data codeword, at least the part being a part other than a part that has been replaced with the other reference, and a correcting capacity of a correction code contained in the code block is equal to or larger than a sum of a number of the closed data codewords and a number of words of the other reference.

With such a method, information contained in the closed data codeword can be contained in the two-dimensional barcode. The part which has been replaced with the closed data codeword can be corrected using the correction code more appropriately. This makes it possible to appropriately extract the data codeword even if replacement with the closed data codeword has been performed.

With the description and the accompanied drawings, at least the following matters will be also apparent.

A device for generating a two-dimensional barcode, including:
an encoder in which:
a protection-encoding pattern is obtained based on a mask pattern reference,
the mask pattern reference being a reference for identifying a mask pattern that is applied to a module group,
the module group being composed of a plurality of modules,
each module being a unit cell constituting the two-dimensional barcode;
a protection-encoded code block is obtained by protection-encoding a code block with the protection-encoding pattern,
the code block having at least a data codeword;
the module group is generated based on the protection-encoded code block; and
the two-dimensional barcode having the module group to which the mask pattern is applied is generated.

With such a device for generating a two-dimensional barcode, the mask pattern reference identifying the mask pattern that is applied to the module group is used for obtaining the protection-encoding pattern. If there are a plurality of the mask patterns, a plurality of the mask pattern references exist. Accordingly, depending on the mask pattern to be applied, it is possible to change a protection-encoding pattern to be applied. Consequently, it is difficult for a third party to identify the protection-encoding pattern. This makes it possible to protect data (data codewords) contained in the two-dimensional barcode more appropriately.

With the description and the accompanied drawings, at least the following matters will be also apparent.

A program causing a computer to perform the following processes:
obtaining a protection-encoding pattern based on a mask pattern reference,
the mask pattern reference being a reference for identifying a mask pattern that is applied to a module group,
the module group being composed of a plurality of modules,
each module being a unit cell constituting a two-dimensional barcode;
obtaining a protection-encoded code block by protection-encoding a code block with the protection-encoding pattern,
the code block having at least a data codeword;
generating the module group based on the protection-encoded code block; and
generating a two-dimensional barcode having the module group to which the mask pattern is applied.

With such a program, the mask pattern reference identifying the mask pattern that is applied to the module group is used for obtaining the protection-encoding pattern. If there are a plurality of the mask patterns, a plurality of the mask pattern references exist. Accordingly, depending on the mask pattern to be applied, it is possible to change a protection-encoding pattern to be applied. Consequently, it is difficult for a third party to identify the protection-encoding pattern. This makes it possible to protect data (data codewords) contained in the two-dimensional barcode more appropriately.

With the description and the accompanied drawings, at least the following matters will be also apparent.

A two-dimensional barcode characterized in that: a protection-encoding pattern is obtained based on a mask pattern reference,
  the mask pattern reference being a reference for identifying a mask pattern that is applied to a module group,
  the module group being composed of a plurality of modules,
  each module being a unit cell constituting the two-dimensional barcode;
a protection-encoded code block is obtained by protection-encoding a code block with the protection-encoding pattern,
  the code block having at least a data codeword;
the module group is generated based on the protection-encoded code block; and
the two-dimensional barcode having the module group to which the mask pattern is applied is generated.
With such a two-dimensional barcode, the mask pattern reference identifying the mask pattern that is applied to the module group is used for obtaining the protection-encoding pattern. If there are a plurality of the mask patterns, a plurality of the mask pattern references exist. Accordingly, depending on the mask pattern to be applied, it is possible to change a protection-encoding pattern to be applied. Consequently, it is difficult for a third party to identify the protection-encoding pattern. This makes it possible to protect data (data codewords) contained in the two-dimensional barcode more appropriately.

With the description and the accompanied drawings, at least the following matters will be also apparent.

A method for reading a two-dimensional barcode, including:
  reading a two-dimensional barcode,
    the two-dimensional barcode being generated by the following steps:
      obtaining a protection-encoding pattern based on a mask pattern reference,
        the mask pattern reference being a reference for identifying a mask pattern that is applied to a module group,
        the module group being composed of a plurality of modules,
        each module being a unit cell constituting the two-dimensional barcode;
      obtaining a protection-encoded code block by protection-encoding a code block with the protection-encoding pattern,
        the code block having at least a data codeword;
      generating the module group based on the protection-encoded code block; and
      applying the mask pattern to the module group;
  extracting the mask pattern reference that is contained in the two-dimensional barcode;
  obtaining the module group by unmasking the two-dimensional barcode using the mask pattern that is identified by the mask pattern reference;
  obtaining the protection-encoded code block from the module group;
  obtaining the code block by protection-decoding the protection-encoded code block using the protection-encoding pattern that is obtained based on the mask pattern reference; and
  extracting the data codeword from the code block.
With such a method for reading a two-dimensional barcode, the mask pattern reference identifying the mask pattern that is applied to the module group is used for obtaining the protection-encoding pattern. If there are a plurality of the mask patterns, a plurality of the mask pattern references exist. Accordingly, depending on the mask pattern to be applied, it is possible to change a protection-encoding pattern to be applied. Consequently, it is difficult for a third party to identify the protection-encoding pattern. This makes it possible to protect data (data codewords) contained in the two-dimensional barcode more appropriately.

In such a method for reading a two-dimensional barcode, it is preferable that the two-dimensional barcode is a two-dimensional barcode which is selected among a plurality of two-dimensional barcodes based on a predetermined evaluation, the plurality of two-dimensional barcodes being generated using a different mask pattern reference.
  With such a method, the optimal two-dimensional barcode cannot be found among two-dimensional barcodes to which different protection-encoding patterns are applied unless the predetermined evaluation is made for all two-dimensional barcodes which are each generated based on a different mask pattern reference. Accordingly, the protection-encoding pattern cannot be decided in advance. This can make it more difficult to identify the protection-encoding pattern. Consequently, it is possible to protect data contained in the two-dimensional barcode more appropriately.

In such a method for reading a two-dimensional barcode, it is preferable that the protection-decoding is a step of XORing the protection-encoded code block with the protection-decoding pattern on a bit-by-bit basis.
  With such a method, both of protection-encoding and protection-decoding can be performed by XORing a code block with a protection-encoding pattern. That is, both of protection-encoding and protection-decoding can be made by a common step.

In such a method for reading a two-dimensional barcode, it is preferable that the two-dimensional barcode is a QR code, and the mask pattern reference is contained in format information of the QR code.
  The format information of the QR code is not masked by the mask pattern according to JIS. Accordingly, when a QR code is read, it is possible to appropriately read the mask pattern reference, which is contained in the format information. Using a predetermined mask pattern identified by the mask pattern reference, masking can be removed.

In such a method for reading a two-dimensional barcode, it is preferable that the code block contains a correction code that corrects the code block, the protection-encoding pattern is obtained based on the mask pattern reference and one other reference, a part of the protection-encoded code block is replaced with the other reference, and a correcting capacity of the correction code is equal to or more than a number of words of the other reference.
  With such a method, it is possible to obtain the protection-encoding pattern using the other reference. This can make it more difficult to identify the protection-encoding pattern. The other reference is used for replacing a part of the protection-encoded code block, and correction is appropriately made using the correction code after the replacement. Accordingly, this makes it more difficult to identify the protection-encoding pattern, and simultaneously makes it possible to extract data appropriately.

In such a method for reading a two-dimensional barcode, it is preferable that a position which has been replaced with the other reference is specified based on the mask pattern reference.

With such a method, the position which has been replaced with the other reference can be changed based on the mask pattern reference. Accordingly, even if changing the position which has been replaced, it is possible to identify the position appropriately based on the mask pattern reference.

In such a method for reading a two-dimensional barcode, it is preferable that when the code block is partly replaced with one other reference, at least a part of the code block is replaced with a closed data codeword, at least the part being a part other than a part that has been replaced with the other reference, and a correcting capacity of a correction code contained in the code block is equal to or larger than a sum of a number of the closed data codewords and a number of words of the other reference.

With such a method, information contained in the closed data codeword can be contained in the two-dimensional barcode. The part which has been replaced with the closed data codeword can be corrected using the correction code more appropriately. This makes it possible to appropriately extract the data codeword even if replacement with the closed data codeword has been performed.

With the description and the accompanied drawings, at least the following matters will be also apparent.

A device for reading a two-dimensional barcode, including:
   a decoder in which:
   a two-dimensional barcode is read,
      the two-dimensional barcode being generated by the following steps:
         obtaining a protection-encoding pattern based on a mask pattern reference,
            the mask pattern reference being a reference for identifying a mask pattern that is applied to a module group,
            the module group being composed of a plurality of modules,
            each module being a unit cell constituting the two-dimensional barcode;
         obtaining a protection-encoded code block by protection-encoding a code block with the protection-encoding pattern,
            the code block having at least a data codeword;
         generating the module group based on the protection-encoded code block; and
         applying the mask pattern to the module group;
   the mask pattern reference contained in the two-dimensional barcode is extracted;
   the module group is obtained by unmasking the two-dimensional barcode using the mask pattern that is identified by the mask pattern reference;
   the protection-encoded code block is obtained from the module group;
   the code block is obtained by protection-decoding the protection-encoded code block using the protection-encoding pattern that is obtained based on the mask pattern reference; and
   the data codeword is extracted from the code block.

With such a device for reading a two-dimensional barcode, the mask pattern reference identifying the mask pattern that is applied to the module group is used for obtaining the protection-encoding pattern. If there are a plurality of the mask patterns, a plurality of the mask pattern references exist. Accordingly, depending on the mask pattern to be applied, it is possible to change a protection-encoding pattern to be applied. Consequently, it is difficult for a third party to identify the protection-encoding pattern. This makes it possible to protect data (data codewords) contained in the two-dimensional barcode more appropriately.

With the description and the accompanied drawings, at least the following matters will be also apparent.

A program causing a computer to perform the following processes:
   reading a two-dimensional barcode,
      the two-dimensional barcode being generated by the following steps:
         obtaining a protection-encoding pattern based on a mask pattern reference,
            the mask pattern reference being a reference for identifying a mask pattern that is applied to a module group,
            the module group being composed of a plurality of modules,
            each module being a unit cell constituting the two-dimensional barcode;
         obtaining a protection-encoded code block by protection-encoding a code block with the protection-encoding pattern,
            the code block having at least a data codeword;
         generating the module group based on the protection-encoded code block; and
         applying the mask pattern to the module group;
   extracting the mask pattern reference that is contained in the two-dimensional barcode;
   obtaining the module group by unmasking the two-dimensional barcode using the mask pattern that is identified by the mask pattern reference;
   obtaining the protection-encoded code block from the module group;
   obtaining the code block by protection-decoding the protection-encoded code block using the protection-encoding pattern that is obtained based on the mask pattern reference; and
   extracting the data codeword from the code block.

With such a program, the mask pattern reference identifying the mask pattern that is applied to the module group is used for obtaining the protection-encoding pattern. If there are a plurality of the mask patterns, a plurality of the mask pattern references exist. Accordingly, depending on the mask pattern to be applied, it is possible to change a protection-encoding pattern to be applied. Consequently, it is difficult for a third party to identify the protection-encoding pattern. This makes it possible to protect data (data codewords) contained in the two-dimensional barcode more appropriately.

===First Embodiment===

A 2D barcode used in the first embodiment will be described below. Unless otherwise stated, the following description is in conformance with Japanese Industrial Standards X 0510:2004 "Two dimensional symbol—QR code—" (hereinafter merely referred to as "JIS"). An encoder in conformance with JIS is referred to as a standard encoder, and a decoder in conformance with JIS is referred to as a standard decoder. An encoder which can perform protection-encoding is referred to as an enhanced encoder, and such a decoder is referred to as an enhanced decoder. These apparatuses will be distinguished below.

In the description below, a "protection-encoding pattern" is a so-called protection mask pattern which is used in a protection-encoding using XORing for the purpose of preventing reading-out. And, the protection-encoding pattern is different from a standard mask pattern in conformance with JIS. The mask patterns set forth in JIS are referred to as "standard mask patterns" in order to distinguish them from the "protection-encoding pattern".

In the following description, a "codeword" is eight bits long. But, the bit length of a "codeword" may be different such as 16 bits, one bit, or the like, depending on a system.

FIG. 1 is a diagram illustrating a QR code symbol 1. The QR code symbol 1 (hereinafter also merely referred to as "QR CODE") has various sizes which range from version 1 to version 40. In this example, functions of version "2" QR code will be described.

The QR code symbol 1 has a function pattern and an encoding region. The function pattern is a pattern required to locate the position of the QR code symbol and to identify the characteristics of the same; the locating and the identifying are necessary to assist in decoding the modules of the QR code. The encoding region is a region in which necessary information is written.

The function pattern includes finder patterns FP, separators SP, timing patterns TP, alignment patterns AP and a quiet zone QZ.

The finder patterns FP are respectively placed at least at three corners of a QR code symbol. At the time of reading, identifying three finder patterns FP makes it possible to exactly specify the orientation and position of the QR code symbol 1.

The separators SP are each light modules of one module width, and are each located around each finder pattern FP. This makes it possible to separate the finder patterns FP from the rest of the QR code symbol 1.

The module M is a unit cell constituting the QR code symbol 1. In principle, one bit is equivalent to one module. Here, a set of a plurality of modules M, each of which is a unit cell constituting a QR code, is referred to as a module group.

The timing patterns TP are each a pattern in which dark and light modules are placed in line alternately one by one. With the timing patterns TP, it is possible to identify the number of the modules of the QR code symbol 1. Accordingly, the version of the QR code can be identified.

The alignment patterns AP are patterns placed in the defined locations according to the version of the QR code. In a case of large modules, the alignment patterns AP assist in locating the position of the QR code symbol 1.

The quiet zone QZ is a light module zone of at least 4 modules width, and is located around the QR code.

The encoding region includes data, error correction codewords (hereinafter also merely referred to as "correction codewords"), and format information FI. And, an encoding region of a large version number includes version information VI. The format information FI contains information of error correction level and information of the standard mask pattern. The information of the standard mask pattern is expressed as a mask pattern reference. Protection-encoding using a standard mask pattern or a protection-encoding pattern (this process will be described later) is applied to only an area within the encoding region, except for the format information FI and the version information VI.

In this example, the data is actual data, and the error correction codewords are those for correcting an error which is caused when the data have not been able to be read-out. The format information contains information on the error correction level applied to the QR code symbol 1 and information on the standard mask pattern used to the QR code symbol 1. The format information FI is an encoding pattern which is required to decode the encoding region.

Figure 2:
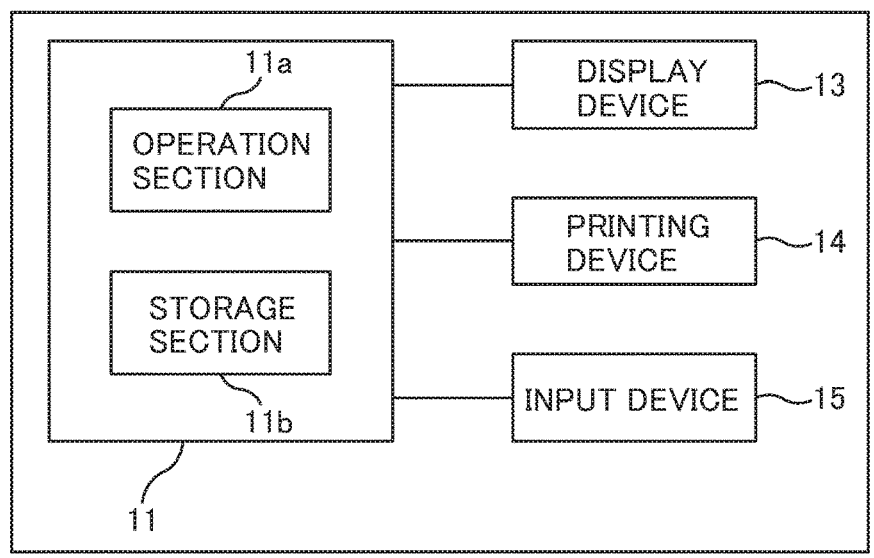
FIG. 2 is a block diagram of an enhanced encoder 10.

FIG. 2 is a block diagram of an enhanced encoder 10 according to the first embodiment. The enhanced encoder 10 is an apparatus for generating the QR code symbol 1, which can execute a process of generating a QR code symbol (to be described later). The enhanced encoder 10 includes a control section 11, a display device 13, a printing device 14 and an input device 15.

The control section 11 includes an operation section 11a and a storage section 11b. The operation section 11a is composed of units such as a Central Processing Unit, and serves as executing programs and performing various operations. The storage section 11b stores data necessary to execute programs. In particular, the storage section 11b stores a program for executing a process of generating a QR code symbol (to be described later).

The display device 13 has a display function necessary at the time of inputting data or the like. The display device 13 outputs by displaying a generated QR code symbol 1. And, the printing device 14 also outputs by printing a generated QR code symbol 1. The input device 15 is used for inputting data and is also used for operating the enhanced encoder 10.

The configuration of the enhanced encoder 10 can be realized by installing a program to a common device like a computer, a mobile phone or a smartphone, the program being for executing a program for performing the protection-encoding step (to be described later).

Figure 3:
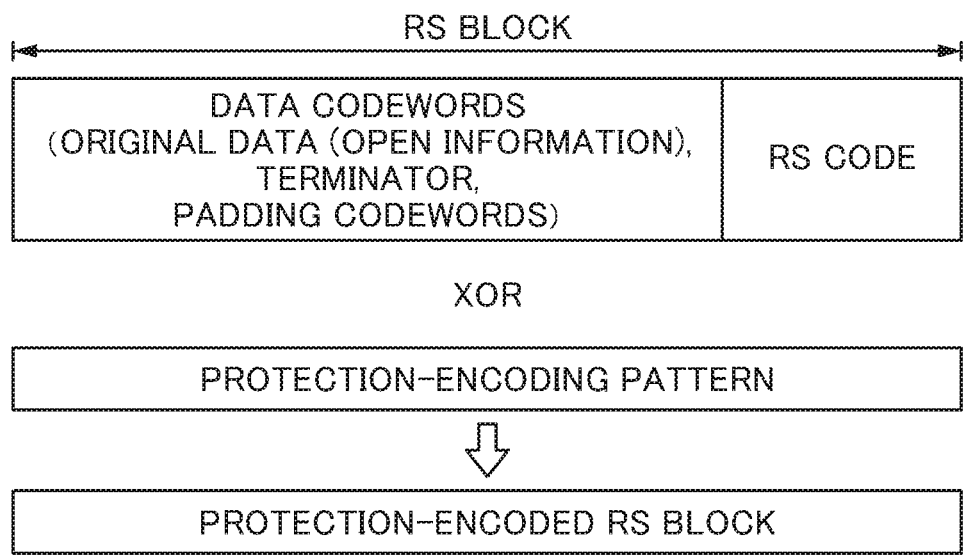
FIG. 3 is a diagram illustrating a process of generating a QR code symbol according to the first embodiment.
Figure 4:
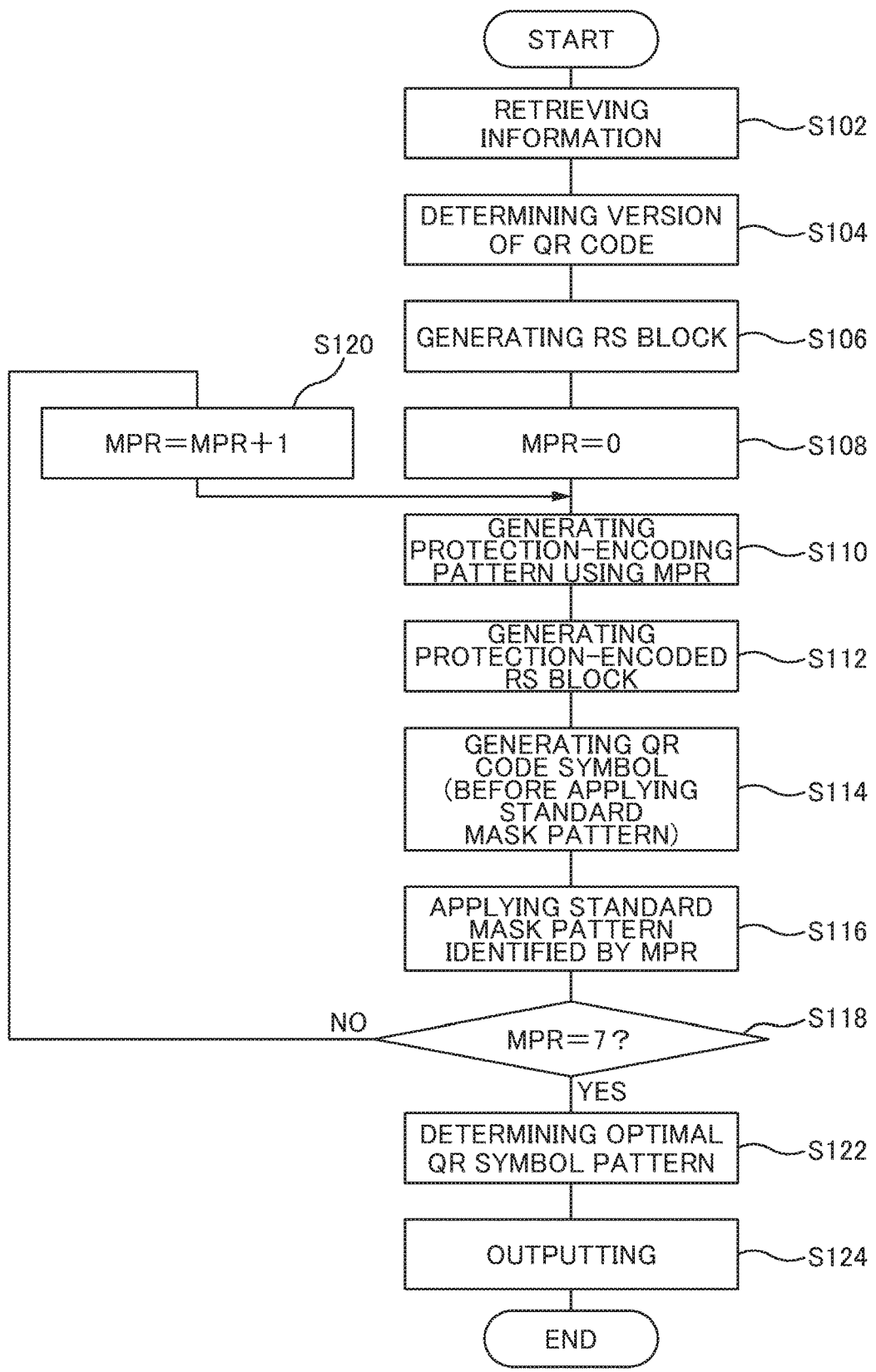
FIG. 4 is a flow chart of a process of generating a QR code symbol according to the first embodiment.

FIG. 3 is a diagram illustrating a process of generating an enhanced QR code according to the first embodiment. FIG. 4 is a flow chart of a process of generating an enhanced QR code symbol according to the first embodiment. Here, as will be described later, protection-encoding of a RS block (corresponding to a "code block") makes it difficult for a third party to read information. Accordingly, a QR code symbol which is generated in the embodiments is referred to as an enhanced QR code symbol (also merely referred to as a QR code symbol). With reference to these figures, the process of generating an enhanced QR code will be described below.

First, original data which are embedded in the QR code symbol 1 are retrieved (S102). Retrieving the original data may be performed via the input device 14, and also, information stored in advance in the storage section 11b may be used.

Next, according to the original data, the version of the QR code symbol 1 is determined (S104). According to its version, the total number of the codewords in the QR code symbol 1 is determined. The total number of the codewords is the sum of the number of the correction codewords and the number of the data codewords; the number of the data codewords includes the number of the codewords of the original data. Also, according to the version of the QR code symbol 1, the size and the number of the RS blocks, consisting of the data codewords and the correction codewords, are determined. Error correction is made for each of the RS blocks.

For example, if error correction is "level H" and version is "4", the total number of the codewords is determined "100". It is also determined that a QR code symbol 1 includes four RS blocks. The number of the data codewords per RS block is "9", and the number of the correction codewords per RS block is "16".

The sum of the number of data codewords "9" and the number of correction codewords "16" is "25". Since there are four RS blocks like this, a QR code symbol of version "4" has 100 codewords in total: 25×4=100.

In this case, the number of error-correctable words per RS block is "8". This means a capacity of correcting "8" data codewords of total "9" data codewords. Since there are four RS blocks, the QR code symbol has a correcting capacity for 32 words in total: 4×8=32. It is possible to correct 32 words of 100 words, and this means that the QR code symbol has correcting capacity of 32% in total.

Next, RS blocks are generated according to the codewords of the original data (S106). A RS block is a block composed of data codewords and Reed-Solomon codes (hereinafter also referred to as "RS codes"), as set forth in JIS. The data codewords contain original data, a terminator and padding codewords. Other information set forth in JIS is contained in some cases. The RS code is a correction code for performing error correction of RS blocks. The RS code used in this example is prescribed in JIS. In order to generate RS blocks, the codewords of the original data are divided into a plurality of blocks. Error correction codewords are generated for each of the blocks, and the generated correction codewords are added next to the corresponding codewords. Then, RS blocks are generated.

Next, the value of the mask pattern reference MPR is reset to "0" (S108). With a mask pattern reference MPR in conformance with JIS, the value of the mask pattern reference MPR ranges from 0 to 7 (from "000" to "111"). In this example, the value of the mask pattern reference MPR changes from 0 to 7, and the processes from step S110 to step S116 (to be described later) are repeated once. For this reason, the value of the mask pattern reference MPR is reset to "0".

Next, a protection-encoding pattern is generated using the mask pattern reference MPR (S110). The protection-encoding pattern is a pattern used for protection-encoding the RS block mentioned above. The RS block is protection-encoded using the protection-encoding pattern, and becomes a protection-encoded RS block. The protection-encoding pattern is used for XORing with a sequence of bits of a RS block in a process to be described later. That is, the protection-encoding pattern is a pattern composed of a sequence of bits.

The following table shows an example of a function that generates the protection-encoding pattern using the mask pattern reference MPR.

TABLE 1

| MPR Value | Functions that are used for Generating Protection-encoding pattern |
|---|---|
| 0 | Function #0 (RSA2048, Key value Ks#0) passcode required: to be entered as data to be encrypted |
| 1 | Function #1 (AES, Key value K#1) passcode required: to be entered as data to be encrypted |
| 2 | Function #2 (3DES, Key value KE#2, value to be encrypted #2) passcode required: to be entered as key KD |
| 3 | Function #3 (RSA2048, Key value Ks#3) passcode required: to be entered as data to be encrypted |
| 4 | Function #4 (AES, Key value K#4) passcode required: to be entered as data to be encrypted |
| 5 | Function #5 (3DES, Key value KE#5, value to be encrypted #5) passcode required: to be entered as key KD |
| 6 | Function #6 (RSA2048, Key value Ks#6) passcode required: to be entered as data to be encrypted |
| 7 | Function #7 (AES, Key value K#7) passcode required: to be entered as data to be encrypted |

It should be noted that the foregoing procedure for generating the protection-encoding pattern using the mask pattern reference MPR is an example. The invention is not limited to the foregoing procedure as long as the protection-encoding pattern is generated using the mask pattern reference MPR.

Depending on the value of the MPR, the functions shown in the foregoing table are employed to generate the protection-encoding pattern. And, a passcode may be used if necessary. Also, if necessary, a passcode (password), which is to be entered voluntarily, may be used as data to be encrypted which is an input value of the function, or may be used as a piece of cryptographic key information which is used in the calculation of an encryption function.

Next, using the generated protection-encoding pattern, a RS block is protection-encoded. Then, the protection-encoded RS block (corresponding to a "protection-encoded code block") is generated (S112). FIG. 3 shows XORing a RS block with a protection-encoding pattern on a bit-by-bit, to generate a protection-encoded RS block. Thus, a RS block is protection-encoded using a protection-encoding pattern. When a plurality of RS blocks exist, all of the RS blocks are protection-encoded. Since XORing is executed on a bit-by-bit basis as mentioned above, both of the protection-encoding step and the protection-decoding step (to be described later) can be the same type of processing (XORing).

Next, using the protection-encoded RS block, a QR code symbol is generated in conformance with the structure set forth by JIS (S114). But, a QR code symbol which has been generated in this step is one to which a standard mask pattern in conformance with JIS has not been applied. The procedure for generating a QR code symbol to which the standard mask pattern has not been applied is in conformance with JIS, and the description will be omitted. Each bit of the protection-encoded RS block is converted to a module, and these modules are placed in corresponding positions. The plurality of modules constitutes a module group, and a standard mask pattern (to be described later) is applied to the module group.

Next, to the generated QR code symbol, a standard mask pattern is applied, the standard mask pattern being identified by the mask pattern reference MPR (S116). Applying a standard mask pattern is in conformance with JIS, and the description will be omitted. Consequently, a standard mask pattern is applied to the module group as mentioned above.

Next, it is judged whether the value of the mask pattern reference MPR is 7 or not (S118). Accordingly, in all cases in which the value of the mask pattern reference MPR is different between 0 and 7, it is judged whether the processes from step S110 to step S114 have been performed or not. In step S118, if the value of the mask pattern reference MPR is not "7", the value of the mask pattern reference MPR increments (S120).

On the other hand, in step S118, if the value of the mask pattern reference MPR is "7", all QR code symbols have been generated which respectively correspond to the value of the mask pattern reference MPR from 0 to 7. And, these eight QR code symbols are evaluated and the optimal pattern of the QR code symbol is determined (S122).

Concerning evaluation of QR code symbols in step S122, "Evaluation of masking result" of JIS is applied thereto, and the description thereof will be omitted. By this evaluation, it is possible to specify a QR code symbol whose modules scatters reasonably.

In the foregoing method, eight types of QR code symbols are stored together, and in step S122, these QR code symbols are evaluated. However, the evaluation may be performed each time when a QR code symbol is generated. And, evaluation value of a QR code symbol which has been currently generated may be compared with the evaluation value of a QR code symbol generated according to the value of the previous mask pattern reference MPR. Only a QR code symbol having a better evaluation value may be stored. And then, generating a next QR code symbol based on the value of the subsequent mask pattern reference MPR, the next QR code symbol may be evaluated and the evaluation value of the next QR code symbol may be compared with that of the foregoing QR code symbol having the best evaluation value so far. This makes it possible to save storage capacity.

Next, the QR code symbol which has been identified in step S122 is output (S124). The output QR code symbol may be displayed by the display device 13, and may be printed by the printing device 14.

To such an enhanced QR code symbol which has been generated as mentioned above, the protection-encoding pattern is applied. Accordingly, a common device for reading a QR code cannot execute the protection-decoding step, and therefore such a device cannot read an enhanced QR code symbol.

Accordingly, the mask pattern reference MPR, which identifies the standard mask pattern applied to the QR code symbol, is used to identify the protection-encoding pattern. Since there are 8 types of the standard mask patterns, the value of the mask pattern reference MPR can have 8 types of numbers. Accordingly, depending on a standard mask pattern to be applied, it is possible to change a protection-encoding pattern to be applied. This makes it difficult for a third party to identify the protection-encoding pattern, and therefore it can be further difficult to extract the data codeword s.

If a procedure according to the foregoing embodiment is used, until the evaluation in step S122 is conducted on all of the QR code symbols generated using different values of the mask pattern reference MPRs from 0 to 7, it is impossible to determine the optimal QR code symbol among the QR code symbols which different protection-encoding patterns generated using different functions applied to. Accordingly, until the evaluation of step S122, a QR code symbol which is to be employed cannot be decided among QR code symbols in which the applied protection-encoding pattern are different. As mentioned above, the protection-encoding pattern cannot be determined in advance. This can make it more difficult to identify the protection-encoding pattern, and therefore it can be further difficult to extract data codeword s. In addition, if a passcode (password) is required to enter, it cannot be known in advance whether or not the passcode is to be used. This is because the use of the passcode depends on evaluation of masking. In such a case, assume that the configuration is made so that entering a passcode is requested at every time when generating a QR code symbol. In this case, even when the passcode is not used according to an evaluation result, entering a passcode is requested. This makes difficult inference for a wrongful analysis.

A standard mask pattern can be applied before the process for generating a protection-encoded RS block in step S112. However, in terms of scattering modules in QR code symbol, it is desirable that a standard mask pattern is applied after the process for generating a protection-encoded RS block in step S112.

The standard mask pattern is applied to only a part of the encoding region which is neither an area of format information FI nor an area of version information VI. Accordingly, the mask pattern reference MPR is not affected by applying the standard mask pattern. At the time of reading a QR code symbol, it is possible to remove the standard mask pattern (unmask) by appropriately reading a mask pattern reference MPR from format information FI.

Figure 5:
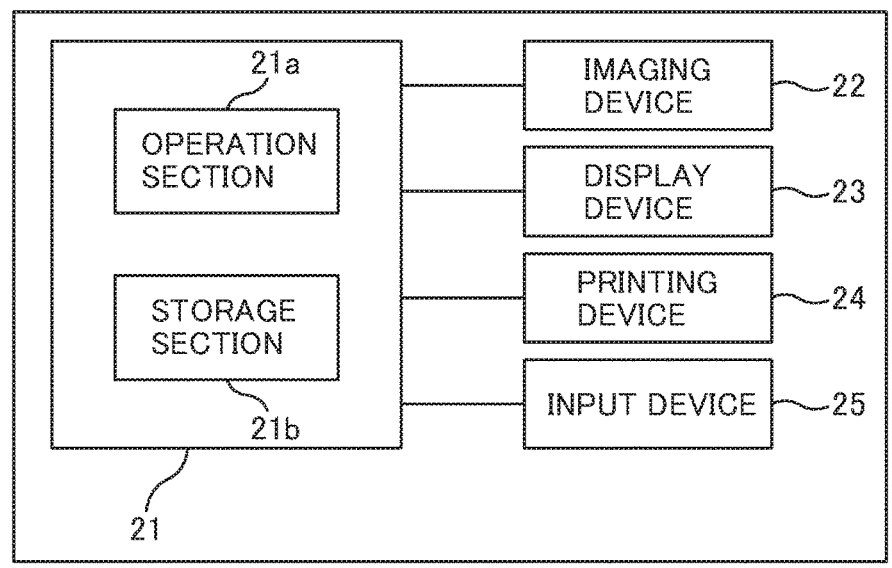
FIG. 5 is a block diagram of an enhanced decoder 20.

Next, a process for reading an enhanced QR code will be described. FIG. 5 is a block diagram of an enhanced decoder 20. The enhanced decoder 20 is an apparatus which can read the enhanced QR code symbol 1. The enhanced decoder 20 includes a control section 21, an imaging device 22, a display device 23, a printing device 24 and an input device 25. A common device for reading a QR code cannot execute the protection-decoding step (to be described later), and therefore such a device cannot appropriately read an enhanced QR code symbol 1.

The control section 21 includes an operation section 21a and a storage section 21b. The operation section 21a is composed of units such as Central Processing Unit, and serves as executing programs and performing various operations. The storage section 21b stores data necessary to execute programs. In particular, the storage section 21b stores a program for executing the reading process of a QR code symbol (to be described later).

The imaging device 22 is a device for imaging the enhanced QR code symbol 1 such as CCD camera or the like.

The display device 23 has a display function necessary at the time of inputting data or the like. The display device 23 outputs by displaying information expanded from a QR code. The printing device 24 outputs by printing such expanded information. The input device 25 is used for inputting data and is also used for operating the enhanced decoder 20.

The configuration of the enhanced decoder 20 can be realized by installing a program to a common device (a dedicated device is not needed) having the imaging device 22 like a computer, a mobile phone or a smartphone, the program being for executing the reading process of an enhanced QR code symbol (to be described later). The configuration can also be realized by combining the enhanced encoder 10 and the enhanced decoder 20 mentioned above.

Figure 6:
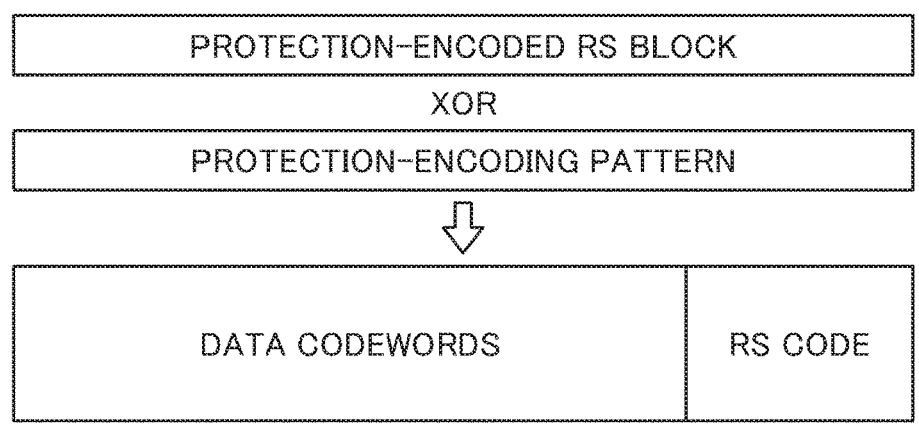
FIG. 6 is a diagram illustrating a process of reading a QR code symbol according to the first embodiment.
Figure 7:
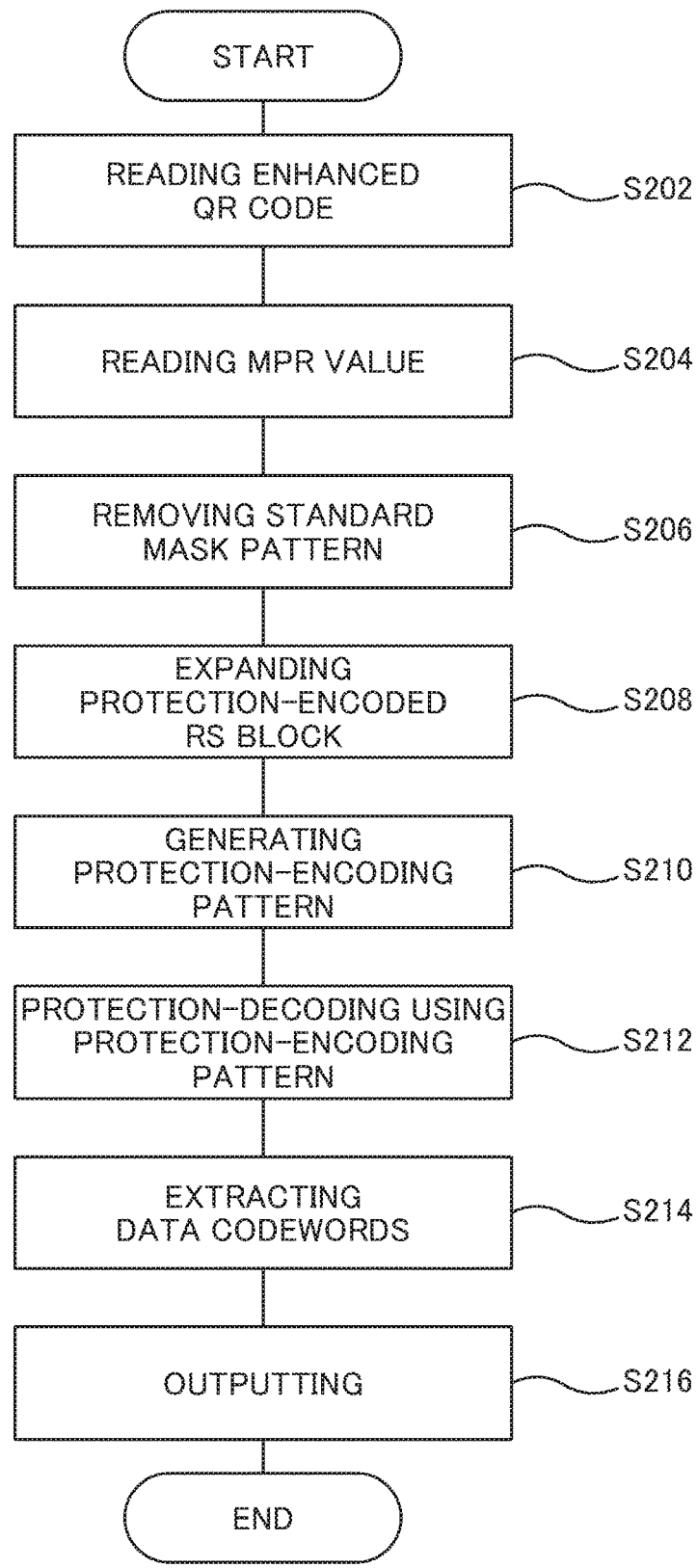
FIG. 7 is a flow chart of a process of reading a QR code symbol according to the first embodiment.

FIG. 6 is a diagram illustrating a process of reading an enhanced QR code symbol according to the first embodiment. FIG. 7 is a flow chart of the process of reading an enhanced QR code symbol according to the first embodiment. With reference to these figures, the process of reading a QR code symbol will be described below.

First, the enhanced QR code symbol 1 is read (S202). Then, from the format information FI of the enhanced QR code symbol which has been read, a mask pattern reference MPR is read-out (S204). Next, the standard mask pattern which has been applied is identified based on the value of the mask pattern reference MPR. Using this identified standard mask pattern, removal of the standard mask pattern (unmasking) is performed (S206). The method for identifying and removing the standard mask pattern are in conformance with JIS, and the description thereof will be omitted. Thus, the foregoing module group is obtained.

Next, from the module group of the enhanced QR code symbol 1 from which the standard mask pattern is removed, a plurality of protection-encoded RS blocks are expanded (S208). Concerning expansion of the plurality of protection-encoded RS blocks, a method in conformance with JIS for expanding RS blocks may be employed. Accordingly, for example, a protection-encoded RS block shown in FIG. 6 is acquired.

Next, the protection-encoding pattern is generated based on the value of the mask pattern reference MPR (S210). Concerning the protection-encoding pattern, it is possible to employ a method similar to the procedure for generating the protection-encoding pattern in step S112 of the foregoing method for generating an enhanced QR code symbol, and therefore, the description thereof will be omitted. This step S210 is performed when the data codewords of the read QR code symbol cannot be extracted in the standard decoding process. As a matter of course, in this case, the data codewords of the QR code symbol cannot be extracted by a normal decoder (standard decoding means). That is, only if attempting to read a QR code symbol which has been protection-encoded using a protection-encoding pattern as in the present embodiment, the processes of and after step S210 are performed. Otherwise, the standard decoding process is performed.

Next, the protection-encoded RS blocks are protection-decoded using the generated protection-encoding pattern (S212). FIG. 6 shows XORing a protection-encoded RS block with a protection-encoding pattern, to generate a protection-decoded RS block (that is, a RS block before protection-encoding). In most cases, there are a plurality of protection-encoded RS blocks, and all of the protection-encoded RS blocks are protection-decoded.

Next, the data codewords are extracted from the RS block (S214). At the time of extracting the data codewords, error correction using a RS code is performed. Due to this error correction, even if data codewords are contaminated, original data codewords can be recovered. Then, the data codewords which have been recovered are extracted. This is because, even if there is a reading error caused by contamination, etc., the error is appropriately corrected using a correction code due to a characteristic of XORing: the error remains in a bit located at the same position in the original codeword even if being protection-decoded using a protection-encoding pattern.

Next, outputted is the original data which is contained in the extracted data codewords (S216). Concerning outputting methods, it may be displayed on the display device 23 or may be printed by the printing device 24.

===Second Embodiment===

Figure 8A:
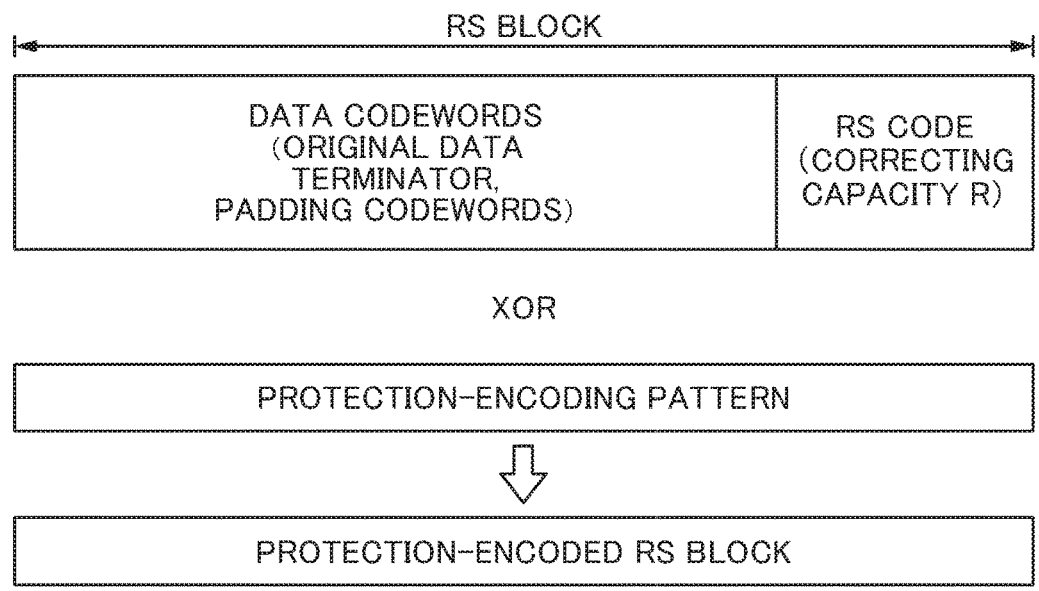
FIG. 8 is a diagram illustrating a process of generating a QR code symbol according to the second embodiment.
Figure 8B:
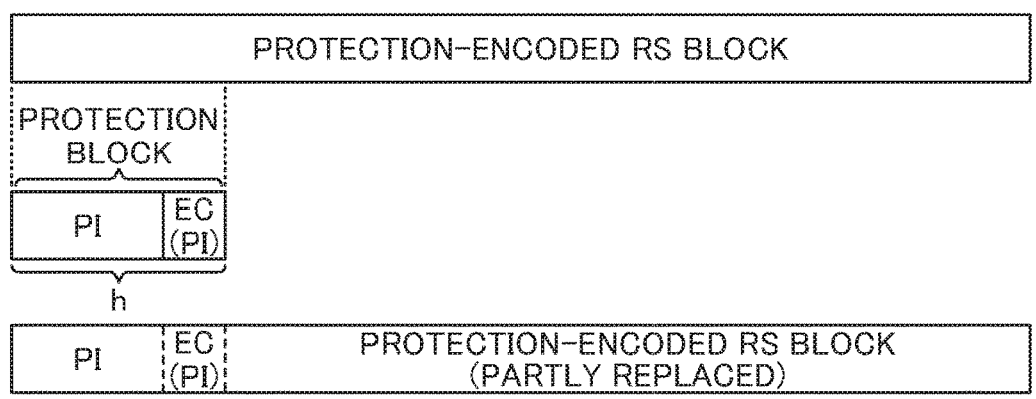

FIG. 8A is a first diagram illustrating a process of generating an enhanced QR code symbol according to the second embodiment. FIG. 8B is a second diagram illustrating the process of generating an enhanced QR code symbol according to the second embodiment.

In the process of generating an enhanced QR code according to the second embodiment, the difference from the first embodiment is that protection-encoding is made using not only a mask pattern reference MPR but also a protection ID (indicated by the symbols "PI" in the figures; corresponding to the "other reference"). A part of a protection-encoded RS block is replaced with the protection ID.

A method for generating an enhanced QR code symbol according to the second embodiment will be described below based on a flow chart, which is partly different from a flow chart used in the first embodiment (FIG. 4).

Processes from step S102 to step S108 are the same as in the first embodiment. The description thereof will therefore be omitted. In the second embodiment, in step S110, using not only the mask pattern reference MPR also the protection ID as mentioned above, the protection-encoding pattern is generated.

In the table below, several functions corresponding to the protection IDs are shown. These functions can be an encryption function such as RSA, AES or 3DES. And, a predetermined key value is used for these functions. Also, if necessary, a passcode (password), which is to be entered voluntarily, may be used as data to be encrypted which is an input value of the function, or may be used as a piece of cryptographic key information which is used in the calculation of an encryption function.

TABLE 2

| PI value | Generating temporary pattern |
| --- | --- |
| 0 | Function #0 (RSA2048, Key value Ks#0, value to be encrypted #0) No passcode * |
| 1 | RFU |
| 2 | RFU |
| 3 | Function #1 (AES, Key value K#1) passcode required: to be entered as data to be encrypted |
| 4 | Function #1 (AES, Key value K#1, value to be encrypted #1) No passcode * |
| ... | |
| 27 | RFU |
| 28 | RFU |
| 29 | Function #5 (3DES, Key value KE#5, value to be encrypted #5) passcode required: to be entered as key KD |
| 30 | Function #5 (3DES, Key value KE#5, KD#5, value to be encrypted #5) No passcode * |
| 31 | Function #0 (RSA2048, Key value Ks#0) passcode required: to be entered as data to be encrypted |

A pattern which has been generated using a protection ID in the foregoing manner is also subject to a bit manipulation which is identified by a mask pattern reference MPR. Then, a protection-encoding pattern is generated. In the table below, shown is bit manipulations corresponding to the values of the mask pattern reference MPRs.

TABLE 3

| MPR Value | Bit manipulations used in Generating Protection-encoding pattern (Bit manipulations applied to Temporary patterns) |
| --- | --- |
| 0 | Bit flipping |
| 1 | Left circular shift by one bit on a bite-by-bite basis |
| 2 | Right circular shift by one bit on a bite-by-bite basis |
| 3 | Left circular shift by two bits on a bite-by-bite basis |
| 4 | Right circular shift by two bits on a bite-by-bite basis |
| 5 | Left circular shift by three bits on a bite-by-bite basis |
| 6 | Right circular shift by three bits on a bite-by-bite basis |
| 7 | Left nibble (four bits) bit flipping |

It should be noted that the foregoing procedure for generating the protection-encoding pattern using the protection ID and the mask pattern reference MPR is an example. The invention is not limited to the foregoing procedure as long as the protection-encoding pattern is generated using the protection ID and the mask pattern reference MPR.

Next, using the protection-encoding pattern which has been generated as mentioned above, a protection-encoded RS block is generated. The method for generating a protection-encoded RS block is as shown in FIG. 8A. As in the description of step S112 in the first embodiment, XORing a RS block with the protection-encoding pattern is executed on a bit-by-bit basis, to generate a protection-encoded RS block.

In the second embodiment, as shown in FIG. 8B, a part of the protection-encoded RS block is also replaced with a protection block.

The protection block is one obtained by adding to the foregoing protection ID a correction code for correcting it (EC (PI) in the figure: EC means "error correction") such as a BCH code or a RS code. As shown in FIG. 8B, the initial part of the protection-encoded RS block is replaced with a protection block in this example.

In the second embodiment, the number of the words of a protection block is h as shown in FIG. 8B. In this case, the RS code of the RS block can correct up to R words as shown in FIG. 8A. The relation "R is equal to or larger than h" exists.

Due to this relation, even if a part of a protection-encoded RS block is replaced with a protection block, it is possible to correct the replaced part using a RS code. Accordingly, in a step of reading an enhanced QR code symbol (to be described later), data codewords can be extracted appropriately.

When the previous processes are completed, the processes from step S114 to step S124 are performed. The processes from step S114 to step S124 are the same as in the first embodiment, and the description thereof will be omitted.

With such a method, the protection-encoding pattern is generated using the mask pattern reference MPR and the protection ID. This can make it more difficult for a third party to extract data codeword.

Figure 9A:
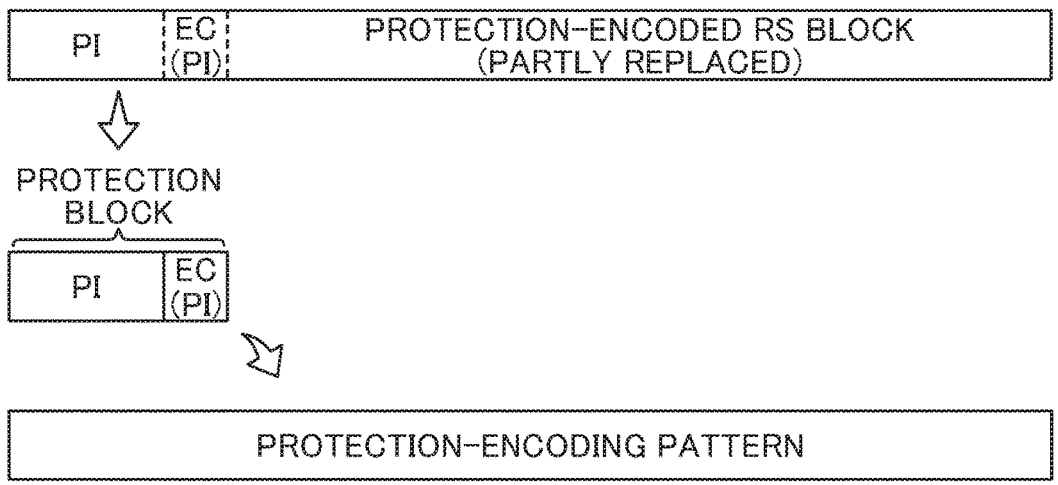
FIG. 9 is a diagram illustrating a process of reading a QR code symbol according to the second embodiment.
Figure 9B:
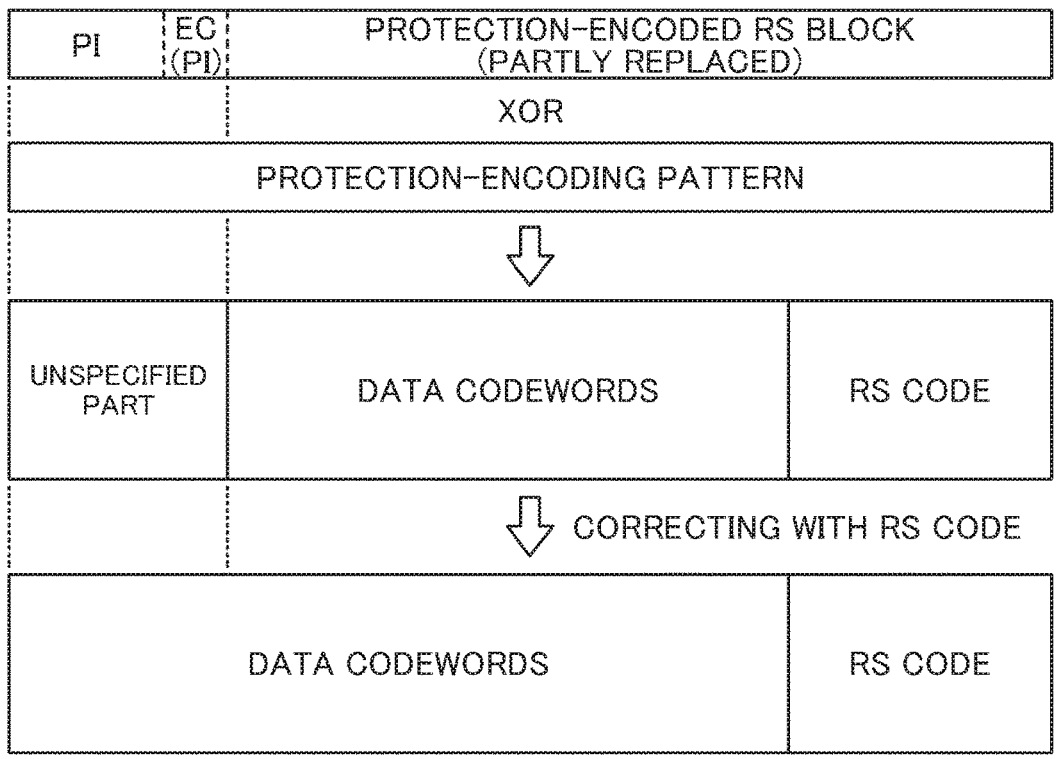

FIG. 9A is a first diagram illustrating a process of reading a QR code symbol according to the second embodiment. FIG. 9B is a second diagram illustrating a process of reading an enhanced QR code symbol according to the second embodiment. Regarding the process of reading an enhanced QR code symbol, the second embodiment shares some points with the first embodiment. A method for reading an enhanced QR code symbol according to the second embodiment will be described below based on a flow chart, which is partly different from a flow chart used in the first embodiment (FIG. 7).

The processes from step S202 to step S208 are the same as in the first embodiment. The description thereof will therefore be omitted. The processes from step S210 to step S214 are replaced to the processes to be described below.

When step S208 is completed, a plurality of protection-encoded RS blocks (partly replaced) are obtained. As mentioned above, each of the protection-encoded RS blocks (partly replaced) is a protection-encoded RS block having a part which is replaced with a protection block. Then, a protection block is extracted from each of the protection-encoded RS blocks (partly replaced).

Next, using the correction code contained in the protection block, the protection ID is corrected. The protection-encoding pattern is generated using the corrected protection ID and the mask pattern reference MPR which is obtained in step S204 (FIG. 9A). The procedure for generating the protection-encoding pattern using the protection ID and the mask pattern reference MPR is the same as mentioned above, and the description thereof will be omitted.

Next, as shown in FIG. 9B, XORing the protection-encoded RS block (partly replaced) with the protection-encoding pattern is executed on a bit-by-bit basis. Then, as shown in FIG. 9B, generated is a RS block in which a part corresponding to the position where the protection block has existed becomes an unspecified part. Using the RS code of the RS block, the RS block is corrected. As a result of correcting the RS block using the RS code, the unspecified part is corrected appropriately, and data codewords are recovered.

As mentioned above, the number of words R which a RS code can correct is equal to or larger than the number of the words h of a protection block. Accordingly, using the RS code, it is possible to recover appropriately the unspecified part, which corresponds to the number of the words h of the protection block.

The data codewords which have been recovered in this manner are extracted and outputted (S216). The output method is the same as in the first embodiment, and the description thereof will be omitted.

===Third Embodiment===

Figure 10:
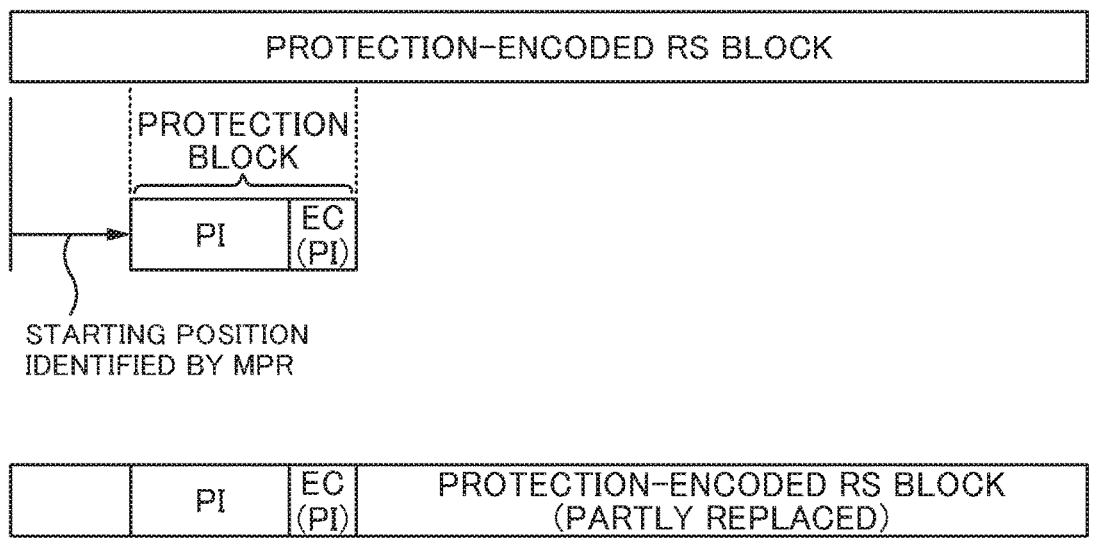
FIG. 10 is a diagram illustrating a process of generating a QR code symbol according to the third embodiment.

FIG. 10 is a diagram illustrating a process of generating a QR code symbol according to the third embodiment. In the foregoing second embodiment, a position which is replaced with a protection block is the initial position of the protection-encoded RS block. In the third embodiment, replacement with a protection block is conducted at a position identified by a mask pattern reference MPR of the protection-encoded RS block.

Though the beginning position of replacement with a protection block may be predetermined appropriately, it is also possible to predetermine beginning position of replacement, as shown in the following table, for example.

TABLE 4

| MPR Value | Beginning position of replacement with PI (2 positions) |
|---|---|
| 0 | Initial end of second RS block and initial end of last RS block |
| 1 | 10th byte of first RS block and initial end of second last RS block |
| 2 | Initial end of second RS block and initial end of second last RS block |
| 3 | 10th byte of second RS block and 3rd bye of last RS block |
| 4 | 4th byte of first RS block and 8th byte of last RS block |
| 5 | Initial end of second RS block and initial end of 3rd RS block |
| 6 | 9th byte of first RS block and 5th byte of third RS block |
| 7 | Initial end of third RS block and 9th byte of last RS block |

This makes it possible to vary, depending on the value of the mask pattern reference MPR, a position which is replaced with a protection ID. Varying the replacement position in such a manner can make it more difficult for a third party to identify the protection-encoding pattern.

Also, the protection-encoding pattern may be more complicated using the mask pattern reference MPR. For example, bit shifting according to the value of the mask pattern reference MPR, as shown in the table 3, can make it more impossible to estimate the protection-encoding pattern.

===Fourth Embodiment===

Figure 11A:
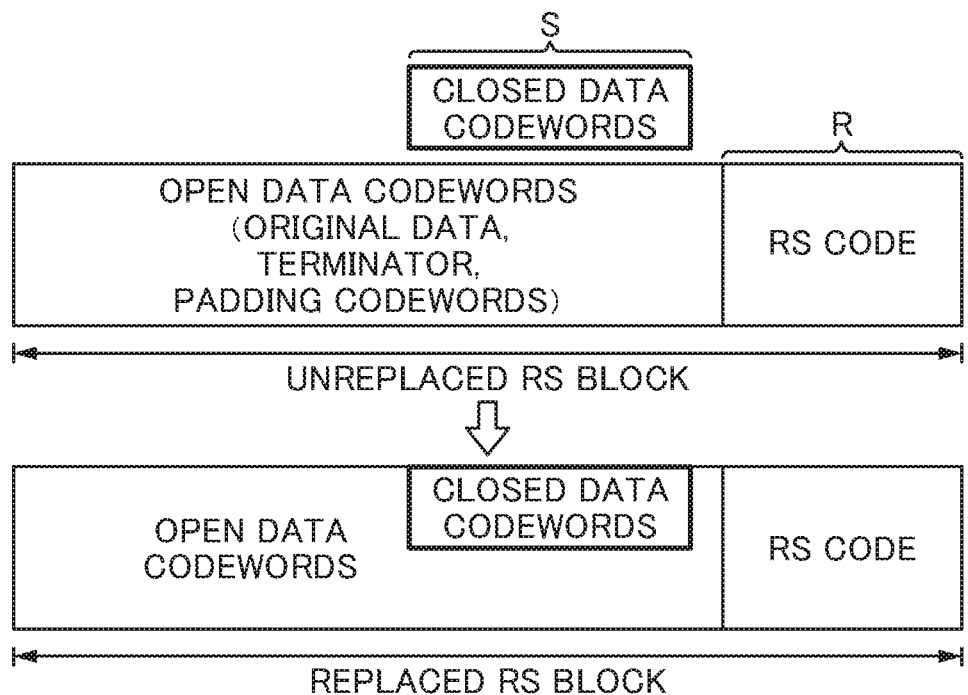
FIG. 11A is a first diagram illustrating a protection-encoding step according to the fourth embodiment.
Figure 11B:
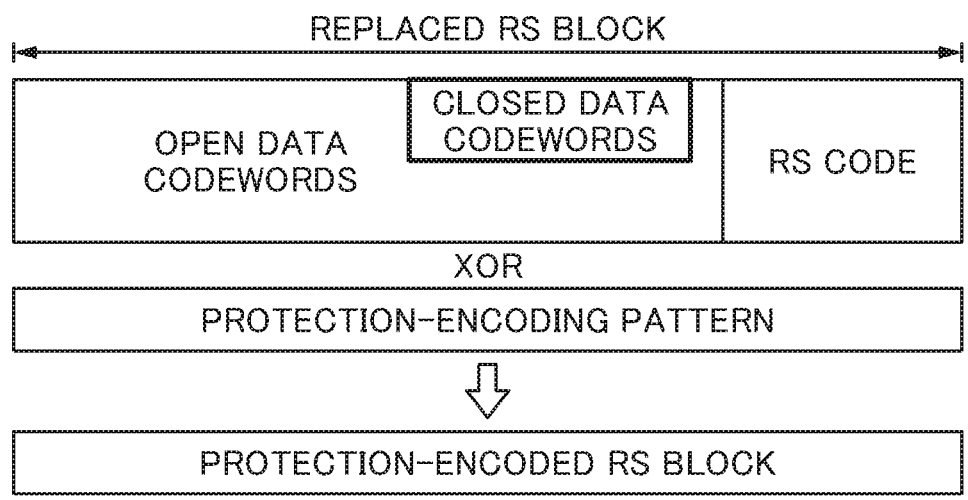
FIG. 11B is a second diagram illustrating the protection-encoding step according to the fourth embodiment.

FIG. 11A is a first diagram illustrating a protection-encoding step according to the fourth embodiment. FIG. 11B is a second diagram illustrating the protection-encoding step according to the fourth embodiment.

In the fourth embodiment, the difference from the first embodiment is that a part of a RS block (an unreplaced RS block) is replaced with closed data codewords to generate a replaced RS block (FIG. 11A). In the fourth embodiment, "closed data codewords" are used. For the sake of clear explanation, in the description of the fourth embodiment, codewords referred to as "data codewords" in the first embodiment are referred to as "open data codewords".

FIG. 11A shows an unreplaced RS block and closed data codewords. The unreplaced RS block contains open data codewords and a RS code, which serves as correction codewords. In the fourth embodiment, a part of an unreplaced RS block is replaced with closed data codewords. In this case, the number of words which a RS code can correct is defined as R and the number of words of the closed data codewords is defined as S, R is equal to or greater than S.

This makes it possible to appropriately recover open data codewords by conducting correction using the RS code even if a part of the open data codewords is replaced with closed data codewords.

In the fourth embodiment, a replaced RS block in which a part of the open data codewords is replaced with closed data codewords is protection-encoded using the protection-encoding pattern (FIG. 11B). Then, a protection-encoded RS block is generated. The procedures for protection-encoding are the same as in the first embodiment, and the description thereof will be omitted.

Figure 12:
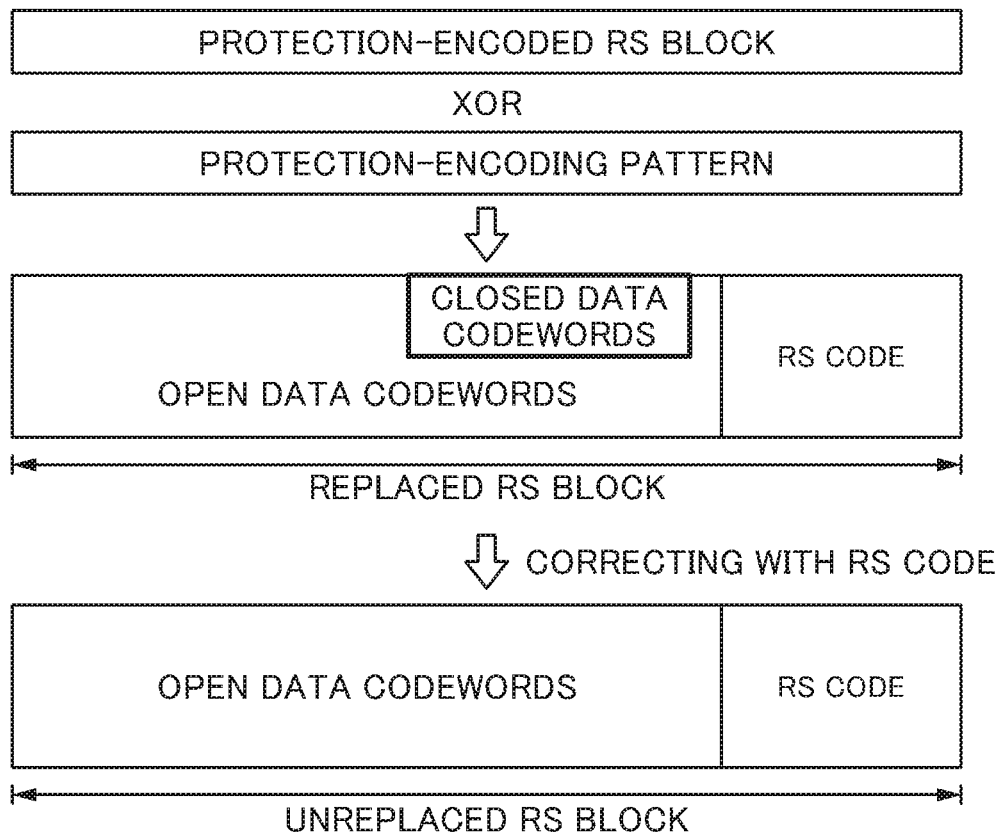
FIG. 12 is a diagram illustrating a protection-decoding step according to the fourth embodiment.

FIG. 12 is a diagram illustrating a protection-decoding step according to the fourth embodiment. FIG. 12 shows how a replaced RS block is obtained by XORing the generated protection-encoded RS block with the protection-encoding pattern as mentioned above.

When the replaced RS block is obtained in the foregoing manner, the closed data codewords are generated. Accordingly, it is possible to appropriately extract the closed data codewords from the replaced RS block. Then, the replaced RS block is corrected using the RS code, and the open data codewords having a part which has been replaced with the closed data codewords is restored appropriately to its state before replacement. This makes it possible to appropriately extract the open data codewords.

With such a method, a QR code symbol can contain closed data codewords in addition to open data codewords. And, it is possible to appropriately protect not only the open data codewords but also closed data codewords.

===Closed Data Codeword===

Here, a concrete method for handling closed data codewords described in the fourth embodiment will be described.

<First Manner Using Closed Data Codewords>

Figure 13:
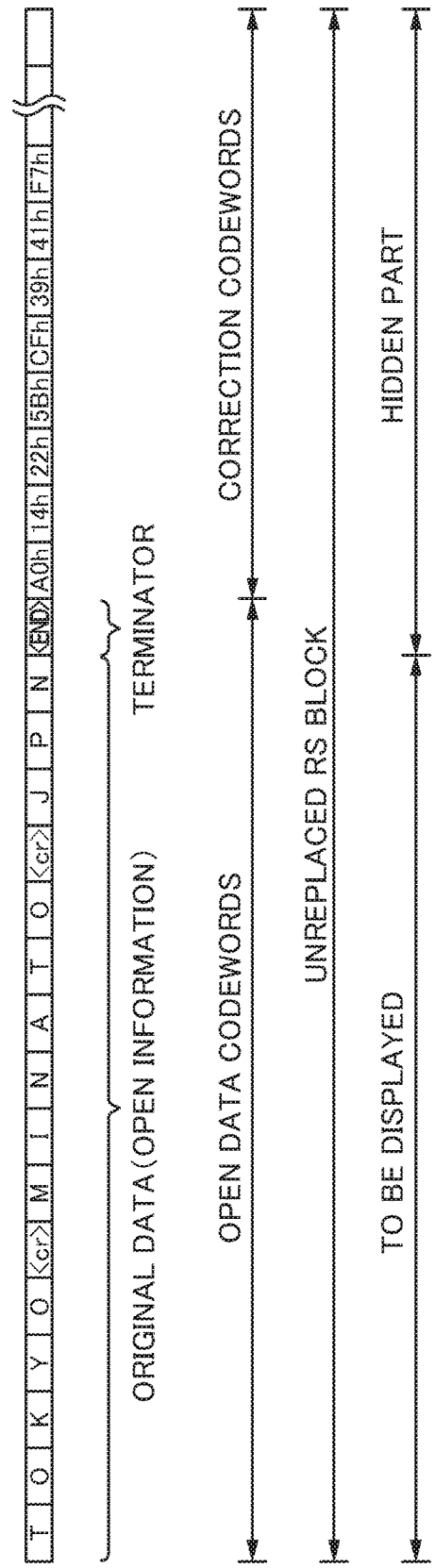
FIG. 13 is a diagram illustrating a RS block.
Figure 14:
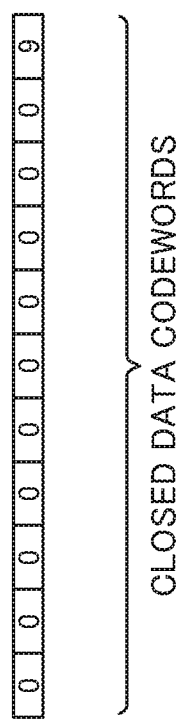
FIG. 14 is a diagram illustrating closed data codewords.

FIG. 13 is a diagram illustrating a RS block. FIG. 14 is a diagram illustrating closed data codewords. In the following description, unless otherwise stated, procedures in conformance with JIS are employed. Though a common QR code symbol 1 is composed of a plurality of RS blocks, one RS block will be described in this example for the purpose of explanation. Since the following description is given as examples in order to simplify the explanation, the lengths of the sets of codewords will be, in some cases, different from those of actual QR code symbols. Also, information contained therein will be, in some cases, different from that of actual QR code symbols.

The first manner using closed data codewords assumes that the storage section 11$b$ stores: "offset information" indicating the beginning position at which replacement with closed data codewords (to be described later) and "length (the number of words) information" of the closed data codewords.

In this example, codewords of the original data is "TOKYO<cr>MINATO<cr>JPN" (FIG. 13), closed data codewords are "00000000009" (FIG. 14). Retrieving the original data and the closed data codewords may be performed via the input device 15, and also, information store in advance in the storage section 11$b$ may be used.

If the lengths of the sets of codewords of the original data is long, the codewords of the original data is divided into a plurality of blocks. Error correction codewords are generated for each of the blocks, and the generated correction codewords are added next to the corresponding codewords. Then, RS blocks are generated. A procedure for generating correction codewords can be in conformance with JIS.

FIG. 13 shows an example of data codewords composed of original data and a terminator (corresponding to the open data codeword) and correction codewords. In this example, plain-text information is illustrated as the codewords of the original data. As the terminator, a sequence of bits "0000" may be employed, for example. A RS code which has been generated according to codewords including the original data is added to generate a RS block.

A part of the RS block generated as mentioned above is replaced with closed data codewords.

Figure 15:
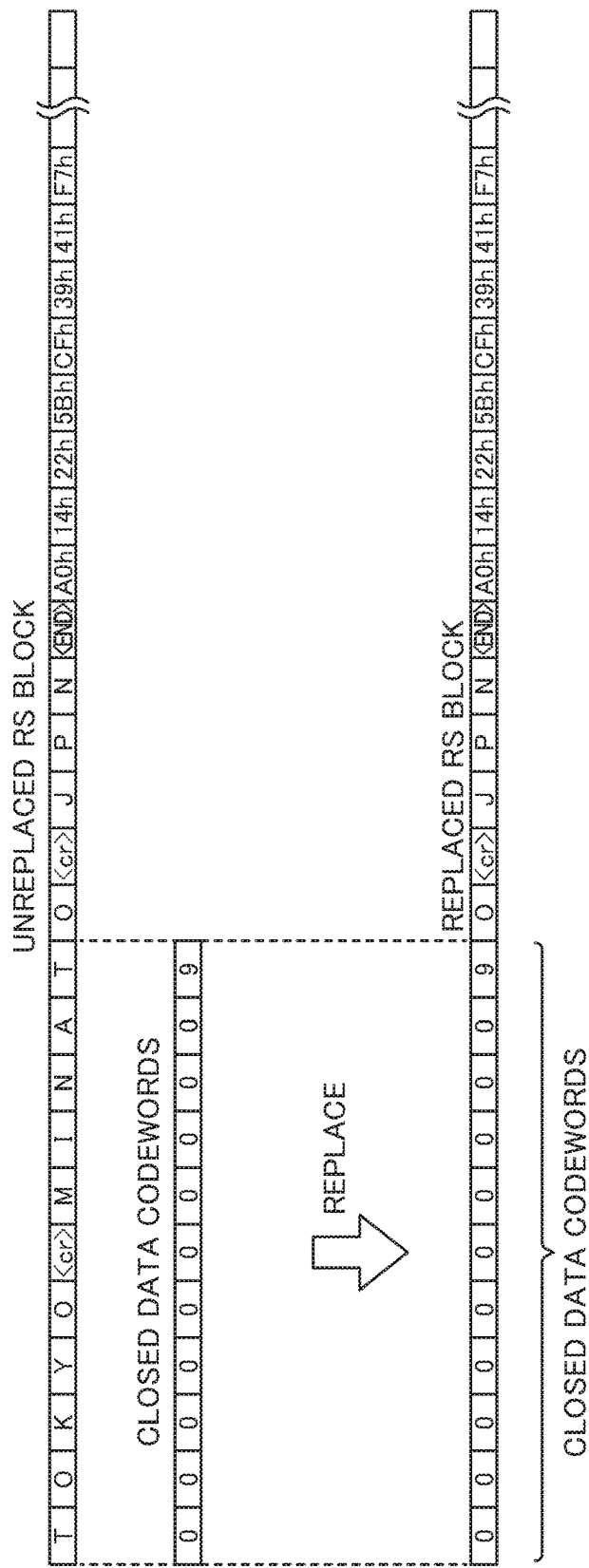
FIG. 15 is a first diagram illustrating how to replace a part of a RS block.

FIG. 15 is a first diagram illustrating how to replace a part of a RS block. FIG. 15 shows the foregoing RS block and closed data codewords. As shown in FIG. 15, the RS block is replaced from its initial word with the closed data codewords.

If a part of a RS block is replaced with closed data codewords as mentioned above, a part of the original data is lost. But, correction can be made for each of the RS blocks. Accordingly, as mentioned above, after the closed data codewords are extracted, the original-data section which has been replaced can be corrected using a RS code. And, the original-data section can be appropriately read-out.

Though, for the purpose of explanation, original data is plain-text data in the foregoing example, the data codewords of the original data themselves may be interleaved or encrypted. Unreplaced RS block may be generated by adding correction codewords to the original data which has been interleaved or the original data which has been encrypted. Interleaving and encrypting mentioned above may be performed for each bit of the original data, not for each codeword of the original data.

Also, the closed data codewords may be interleaved or encrypted. The closed data codewords may be encoded for the purpose of error detection or error correction (for example, coded into a RS code).

Next, a procedure for obtaining closed data codewords and open data codeword s. This embodiment assumes that the storage section 21$b$ of the decoder 20 stores the "length (the number of words) information" of closed data codewords.

Figure 16:
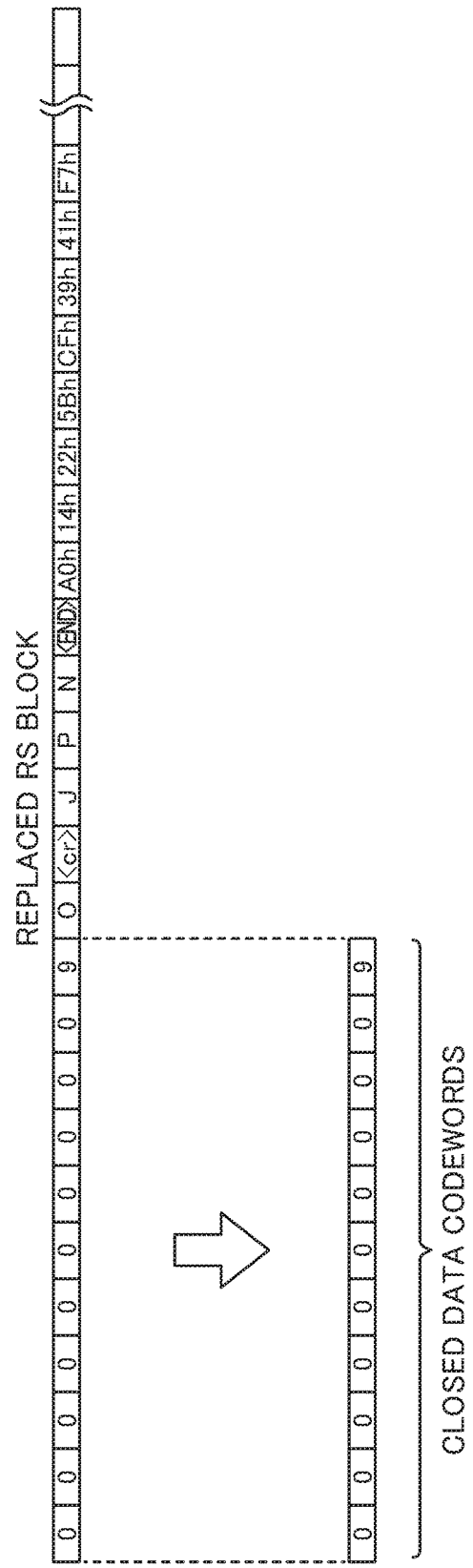
FIG. 16 is a diagram illustrating reading-out method for extracting closed data codewords.

FIG. 16 is a diagram illustrating reading-out method for extracting closed data codewords. FIG. 16 shows a replaced RS block and closed data codewords.

The replaced RS block in FIG. 16 can be acquired by reading and expanding the QR code symbol in conformance with JIS. The enhanced decoder 20 extracts the closed data codewords based on the length information of the closed data codewords, the information being stored in the storage section 21$b$.

Figure 17:
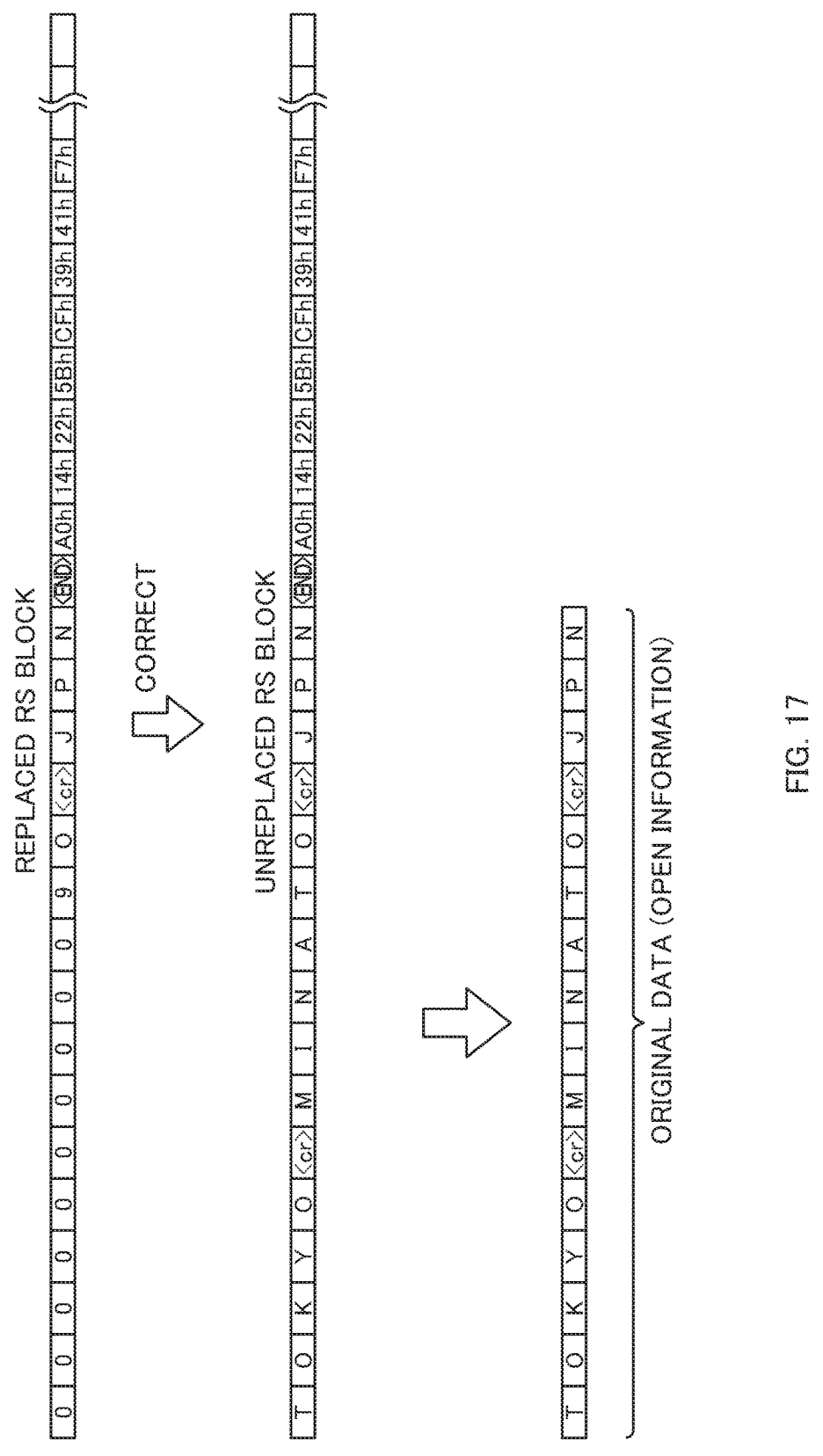

FIG. 17 is a diagram illustrating a method for reading-out original data. The decoder 20 acquires an unreplaced RS block by performing error correction of the replaced RS block. The enhanced decoder 20 reads-out information which is located from the initial end of the unreplaced RS block to a terminator, and the data which has been read-out will be treated as the original data.

If the data codewords of the original data themselves are interleaved as mentioned above, the data codewords are subsequently sorted in a certain procedure so as to be in its original order. If the data codewords of the original data are encrypted, the original data is decoded in a certain decoding method.

Figure 18:
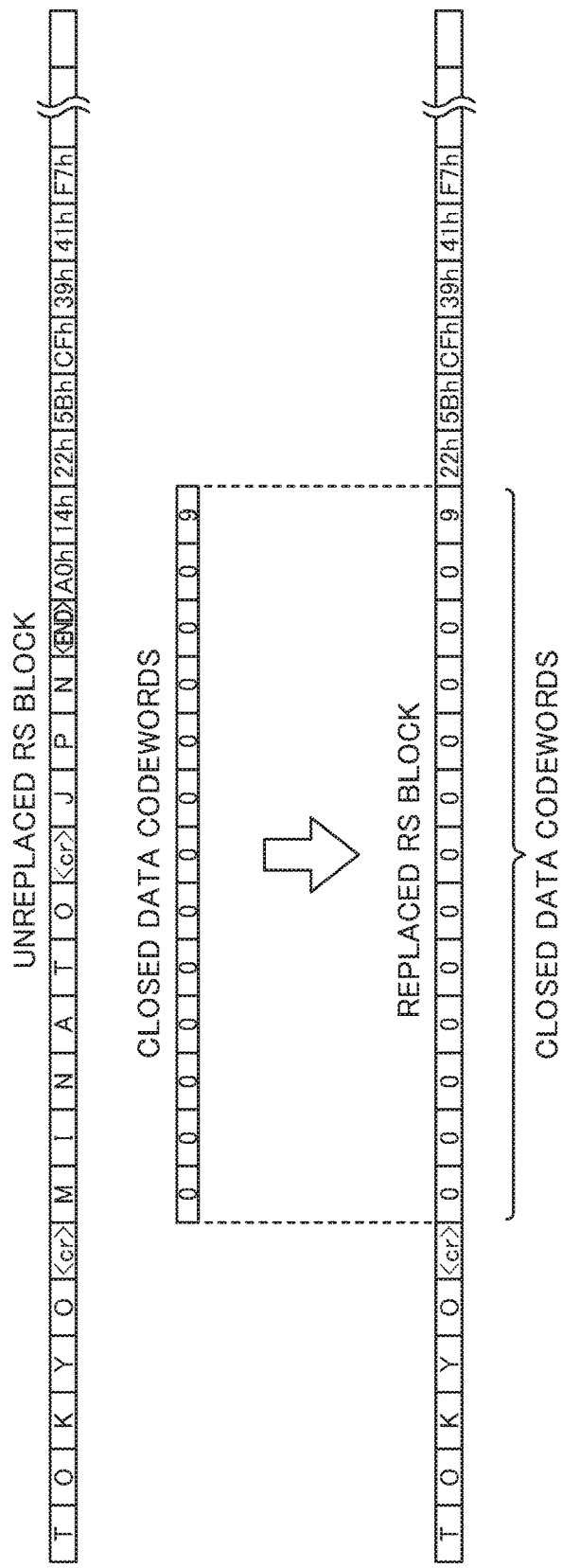
FIG. 18 is a second diagram illustrating how to replace a part of a RS block.

FIG. 18 is a second diagram illustrating how to replace a part of a RS block. Taking into consideration the correcting capacity of Reed-Solomon code, any positions in the RS block may be replaced with closed data codewords.

In this case, it is possible to predetermine a position of the RS block at which replacement with the closed data codewords starts (how many words from the initial word to the position). For example, as shown in FIG. 18, a RS block may be replaced with 13 words of closed data codewords starting at the 7th word from the initial word. In this case, the storage section 11b of the enhanced encoder 10 and the storage section 21b of the enhanced decoder 20 store the offset information that the closed data codewords starts at 7th word in the replaced RS block, the position having been predetermined. Also, these storage sections store length information that the length of the closed data codewords is 13 words. In this case, since the number of closed data codewords is smaller than the number of words which can be corrected with the RS code, correcting makes it possible to appropriately acquire an unreplaced RS block. It is possible to read-out the original data from the unreplaced RS block.

In this case, the final end of the closed data codewords with which the RS block has been replaced may be defined by adding a certain separator to the final word of closed data codewords.

Figure 19:
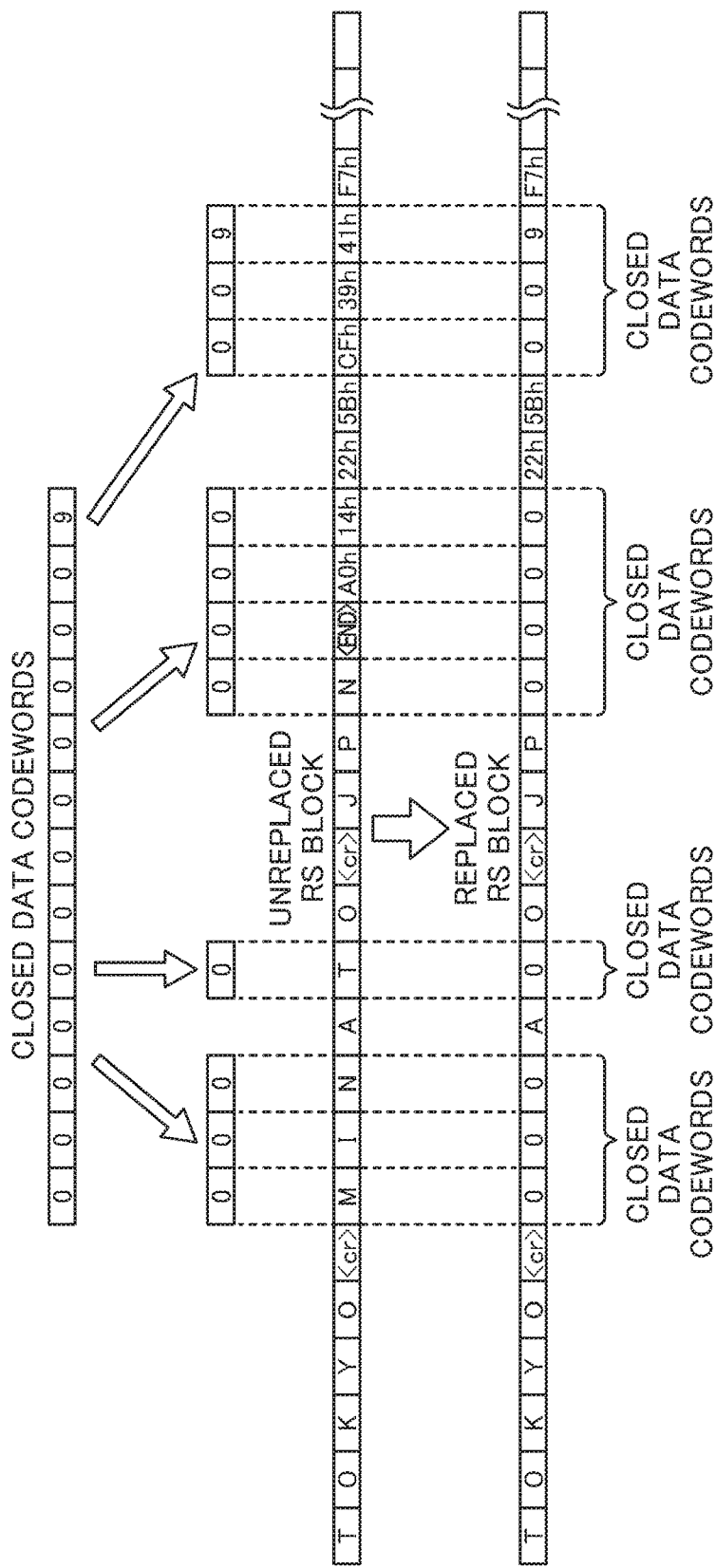
FIG. 19 is a third diagram illustrating how to replace a part of a RS block.

FIG. 19 is a third diagram illustrating how to replace a part of a RS block. In this example, parts of a RS block are replaced with closed data codewords which are divided into multiple parts.

In this case, it is possible to predetermine a plurality of positions from which the RS block is to be replaced with the parts of closed data codewords. For example, as shown in FIG. 19, the following replacements are acceptable. The RS block is replaced with three words of closed data codewords starting at 7th word from the initial word. And, the RS block is replaced with one word of closed data codewords starting at 11th word from the initial word. And, the RS block is replaced with four words of closed data codewords starting at 16th word from the initial word. And, the RS block is replaced with three words of closed data codewords starting at 22th word from the initial word.

In this case, the storage section 11b of the enhanced encoder 10 and the storage section 21b of the enhanced decoder 20 stores the foregoing information as the offset information and as the length information. Accordingly, the enhanced decoder 20 can extract each part of the closed data codewords from the corresponding positions, which are identified in advance. Also in this case, since the number of closed data codewords is smaller than the number of words which can be corrected with the RS code, correction allows the unreplaced RS block to be appropriately acquired. It is possible to read-out the original data from the unreplaced RS block.

<Second Manner Using Closed Data Codewords>

In the foregoing the first manner, information of the positions of the offset information and the length information of closed data codewords is stored in advance in the storage section 11b of the enhanced encoder 10 and in the storage section 21b of the enhanced decoder 20 (the information of the positions is hereinafter referred to as placement information). In the second manner, placement information is stored in header data codewords (a "header" in the drawings). In addition, the header data codewords are contained in a replaced RS block in the second embodiment.

Figure 20:
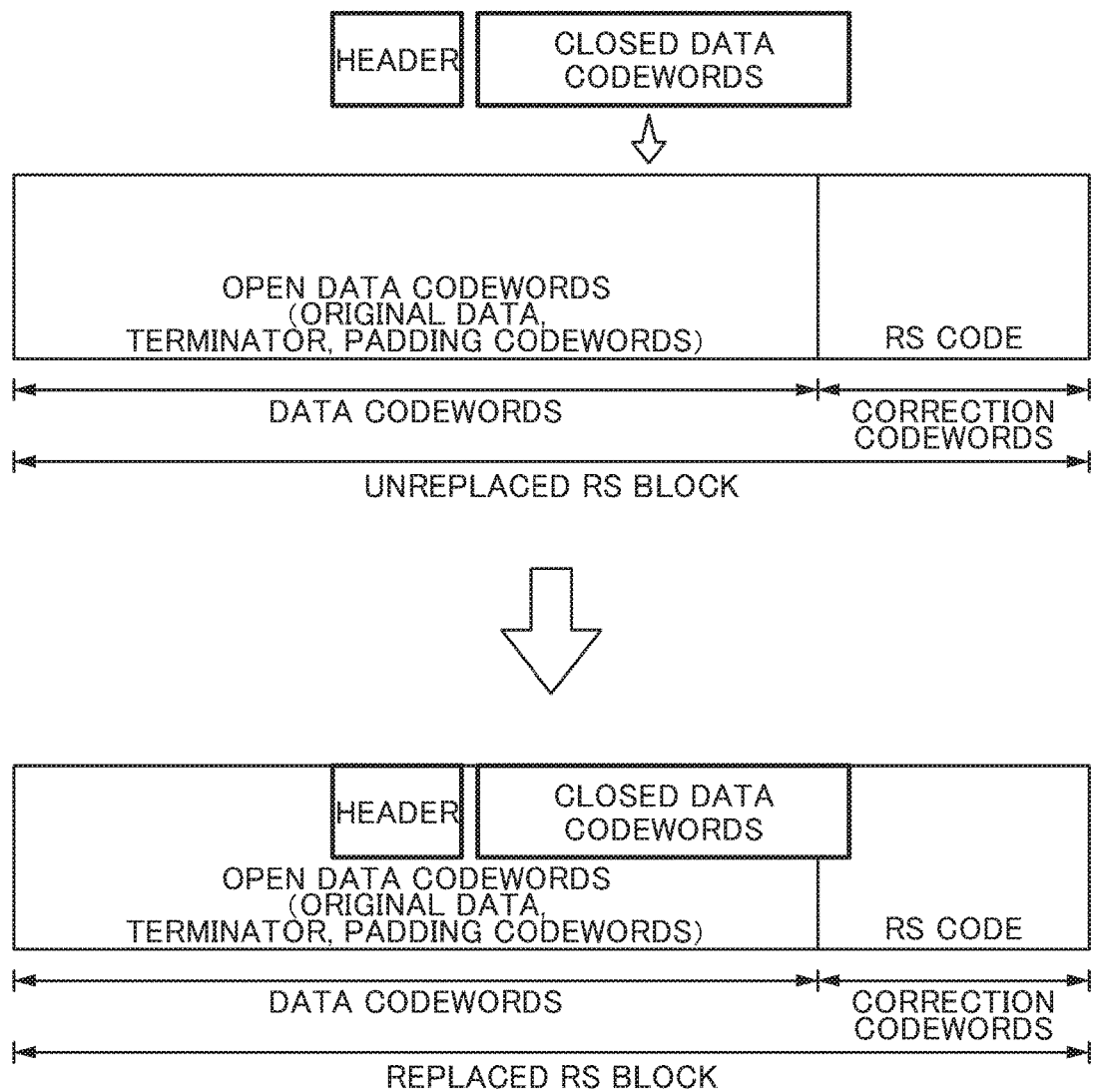
FIG. 20 is a conceptual diagram of a RS block according to the second manner using closed data codewords.

FIG. 20 is a conceptual diagram of a RS block according to the second manner using closed data codewords. In the second manner, the enhanced encoder 10 replaces a part of an unreplaced RS block with header data codewords and closed data codewords, and generates a replaced RS block.

In the second manner, a replacement with the header data codewords and a replacement with the closed data codewords, both are performed so that the number of the replaced words does not exceed the number of error-correctable words in the RS block. That is, the total number of the header data codewords and the closed data codewords does not exceed the number of error-correctable words in the RS block.

The header data codewords shown in FIG. 20 contains placement information of the closed data codewords, as mentioned above. Accordingly, with reference to the header data codewords, it is possible to locate the beginning position of the closed data codewords and its length (the number of words). The positions of the header data codewords are predetermined. In addition, the header data codewords can contain information related to the format of the closed data codewords. Information related to the format of the closed data codewords contains the following types of information: information of a cryptographic key which is used if the closed data codewords are encrypted; and information of sorting which is performed if the closed data codewords are interleaved. If the closed data codewords are encoded for the purpose of error detection or error correction, information of a procedure for error detection or error correction is also contained.

Figure 21:
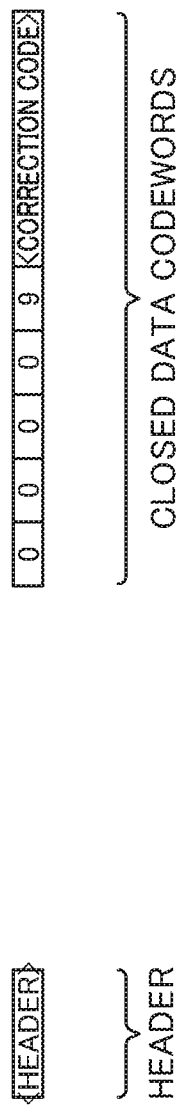
FIG. 21 is a diagram illustrating a header data codeword and closed data codewords according to the second manner using closed data codewords.

FIG. 21 is a diagram illustrating header data codewords and closed data codewords according to the second manner using closed data codewords. FIG. 21 shows the header data codewords and the closed data codewords, and also shows that the closed data codewords contain correction-code words.

Figure 22:
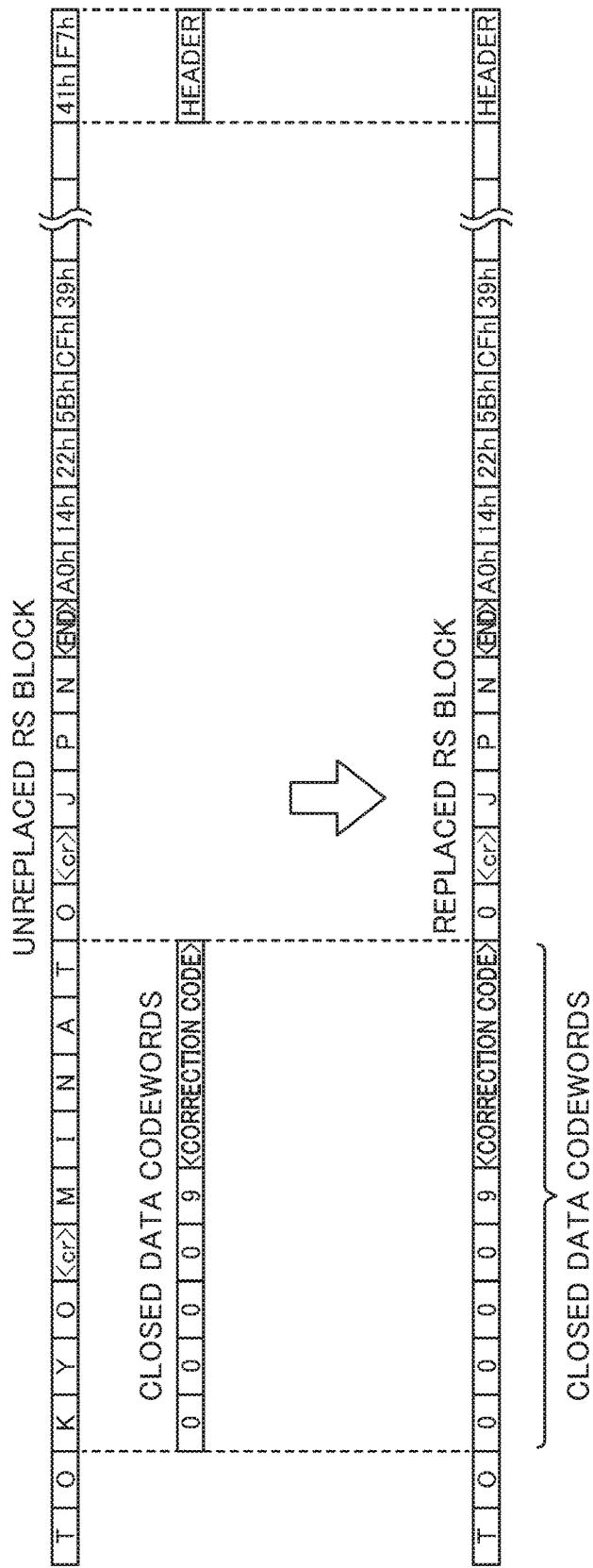
FIG. 22 is a first diagram illustrating how to replace a part of a RS block in a procedure according to the second manner using closed data codewords.

FIG. 22 is a first diagram illustrating how to replace a part of a RS block in a procedure according to the second manner using closed data codewords. FIG. 22 shows a RS block, closed data codewords, and header data codewords. In this example, as shown in FIG. 22, the RS block is replaced from the third word from its initial end with the closed data codewords by the enhanced encoder 10. The final end part of the RS block is replaced with the header data codewords. The header data codewords contains placement information of the closed data codewords (in this case, that the closed data codewords starts at the third word from the initial end of the RS block, and that the length of the closed data codewords is 9 words).

If a part of a RS block is replaced with the closed data codewords as mentioned above, a part of the original data and a part of the correction codewords are lost. However, correction can be made for each of RS blocks. Accordingly, using a RS code, the standard decoder can correct the original-data section which has been replaced. And, the standard decoder can appropriately read-out and display the original-data section. The part which is replaced with the closed data codewords is treated as information which is considered as an error and which is discarded, the error being an error caused by contamination of the QR code symbol 1 or the like. Consequently, the standard decoder cannot display the closed data codewords.

On the other hand, the enhanced decoder 20 extracts the closed data codewords from the replaced RS block. And, the enhanced decoder 20 acquires from the header data codewords, placement information which is for locating the positions of the closed data codewords. Based on the placement information, the closed data codewords are extracted. Since the correction-code words are added to the closed data codewords, the contaminated closed data codewords can be corrected using the correction-code words.

If the closed data codewords are interleaved, the closed data codewords can be sorted in its original order based on the information of an interleaving procedure contained in the header data codewords. Also, if the original data is interleaved, the original data can be sorted in its original order based on the information of an interleaving procedure contained in the header data codewords. If the closed data codewords are encrypted, the closed data codewords can be decoded based on a cryptographic key contained in the header data codewords or the like. As mentioned above, if the closed data codewords are encoded for the purpose of error detection or error correction (for example, coded into a RS code), a procedure for correcting an error can be specified based on information contained in the header data codewords.

After the closed data codewords are extracted as mentioned above, the enhanced decoder 20 corrects the replaced RS block and obtains an unreplaced RS block. Then, the original-data section contained in the unreplaced RS block is read-out. And, the closed data codewords and the original-data section which have been read-out are displayed.

Figure 23:
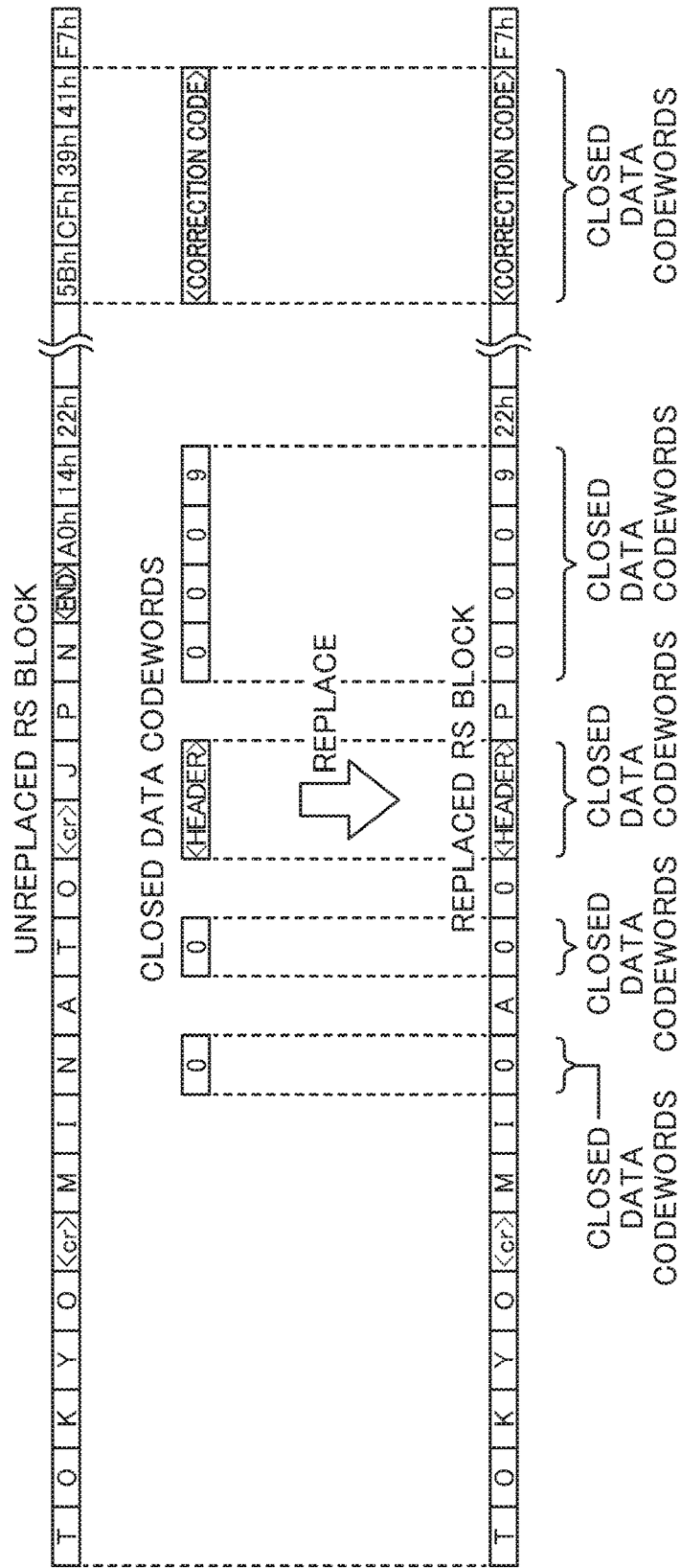
FIG. 23 is a second diagram illustrating how to replace a part of a RS block in a procedure according to the second manner using closed data codewords.

FIG. 23 is a second diagram illustrating how to replace a part of a RS block in a procedure according to the second manner using closed data codewords. In this example, it is predetermined that the header data codewords start at the 13th word of the RS block and that the length of the header data codewords is two words. If the RS block is replaced with the separated closed data codewords as mentioned above, the header data codewords contain a plurality of pieces of placement information of the closed data codewords. This makes it possible to appropriately extract the closed data codewords with reference to the header data codewords.

In the foregoing description, the positions of the header data codewords are predetermined. However, the positions of the header data codewords may be indicated by delimiters which are respectively placed adjacent to the header data codewords on both sides of the header data codewords.

Concerning whether the read QR code symbol is a common QR code symbol or is a QR code symbol according to the second manner, the judgment can be made based on whether or not the extracted closed data codewords include header data codewords. That is, since a QR code symbol according to the second manner contains header data codewords, the enhanced decoder 20 can display closed data codewords. On the other hand, since a common QR code symbol does not contain a header data codeword, the enhanced decoder 20 can display only information to be displayed without displaying the closed data codewords.

<Third Manner Using Closed Data Codewords>

Figure 24:
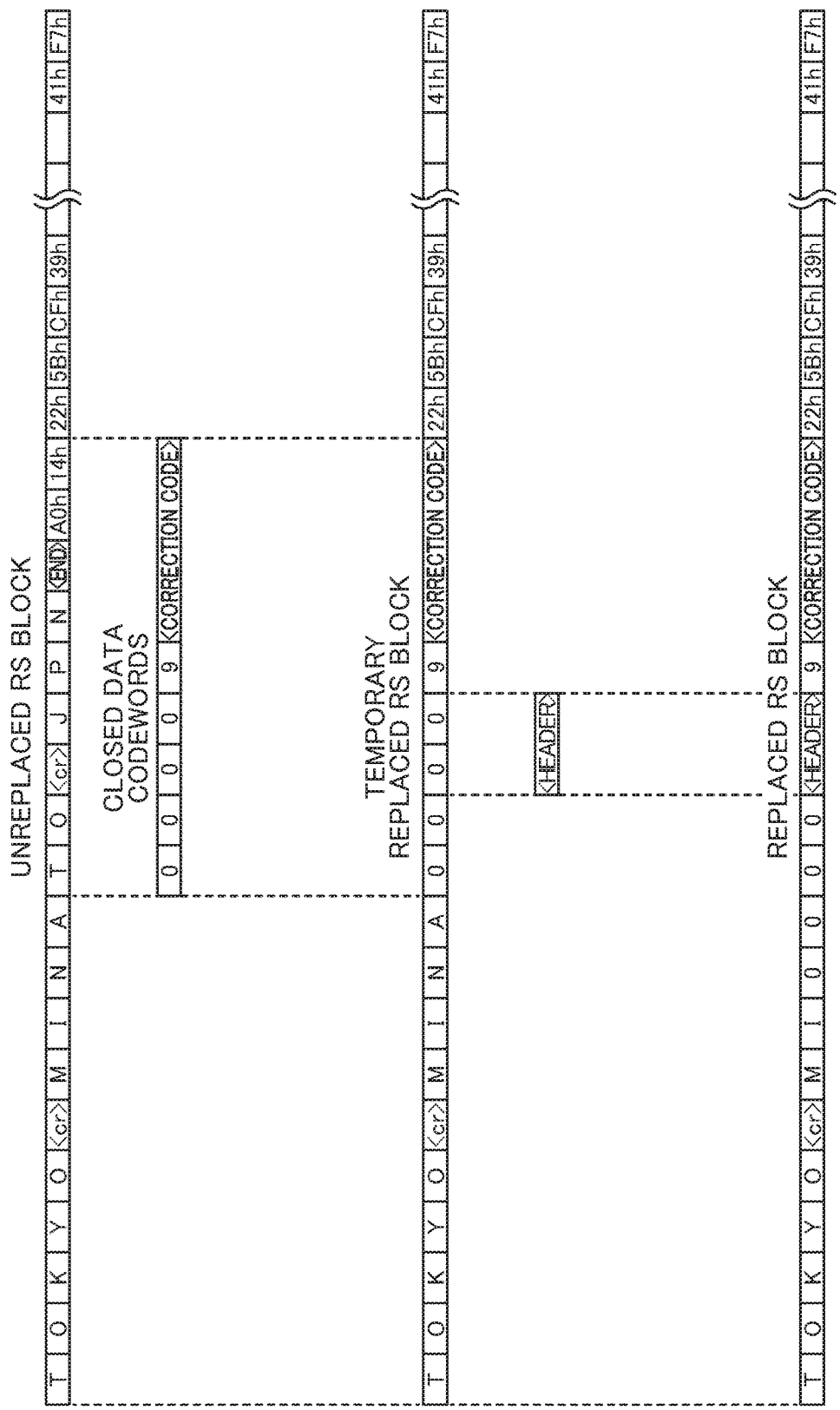
FIG. 24 is a diagram illustrating how to replace a part of a RS block in a procedure according to the third manner using closed data codewords.

FIG. 24 is a diagram illustrating how to replace a part of a RS block in a procedure according to the third manner using closed data codewords. FIG. 24 shows an unreplaced RS block, closed data codewords, a temporary replaced RS block, header data codewords and a replaced RS block.

In the third manner, the enhanced encoder 10 replaces a part of the unreplaced RS block with the closed data codewords, and generates the temporary replaced RS block. The closed data codewords include the correction-code words, which have a correcting capacity sufficiently to correct words replaced with the header data codewords, as described later.

Next, the enhanced encoder 10 replaces a part of the temporary replaced RS block with the header data codewords, the part of the temporary replaced RS block being a part of the replaced words which have been replaced with the closed data codewords. And, the enhanced encoder 10 generates the replaced RS block. Subsequently, the enhanced encoder 10 generates a QR code symbol based on the generated replaced RS block.

Next, a decoding procedure will be described. The enhanced decoder 20 according to the third manner reads a QR code symbol generated as mentioned above, and expands a replaced RS block. Then, the enhanced decoder 20 reads-out the header data codewords. The positions of the header data codewords may be predetermined as in the first embodiment and the second embodiment. Also, the positions of the header data codewords may be indicated by delimiters which are respectively placed adjacent to the header data codewords on both sides of the header data codewords.

Based on placement information contained in the header data codewords which has been read-out as mentioned above, the positions of the closed data codewords are identified, and then the closed data codewords are extracted. Since the closed data codewords contains correction-code words as mentioned above, correction based on the correction-code words allows to appropriately correct a part which has been replaced with the header data codewords. Thus, the closed data codewords before being replaced with header data codewords are appropriately extracted.

This makes it possible to acquire a temporary replaced RS block. Next, the decoder 20 performs a correcting operation using correction-code words, the correction-code word being included in the unreplaced RS block. Thus, a part replaced with the closed data codeword is appropriately corrected, and the unreplaced RS block can be acquired. Then, the enhanced decoder 20 can read-out the original data from the unreplaced RS block.

In the third manner, the number of closed data codewords does not exceed the number of words which can be corrected with correction-code words included in the unreplaced RS block. In the third manner, the number of header data codewords does not exceed the number of words which can be corrected with correction-code words contained in the closed data codewords. This makes it possible to read-out appropriately the closed data codeword and the original data.

In the third manner, a part of replaced words which have been replaced with the closed data codewords is replaced with header data codewords. For this reason, the header data codewords overlap the closed data codewords. Accordingly, the total length of the header data codewords and the closed data codewords can be reduced. This makes it possible to increase reserve capability for detecting and correcting an error of the QR code symbol.

In the third manner, as in the second manner, concerning whether the read QR code symbol is a common QR code symbol or is a QR code symbol according to the third embodiment, the judgment can be made based on whether or not the extracted closed data codewords include header data codewords. That is, since a QR code symbol according to the third manner contains header data codewords, the enhanced decoder 20 can display closed data codewords. On the other hand, since a common QR code symbol does not contain header data codewords, the enhanced decoder 20 can display only information to be displayed without displaying closed data codewords.

<Fourth Manner Using Closed Data Codewords>

Figure 25:
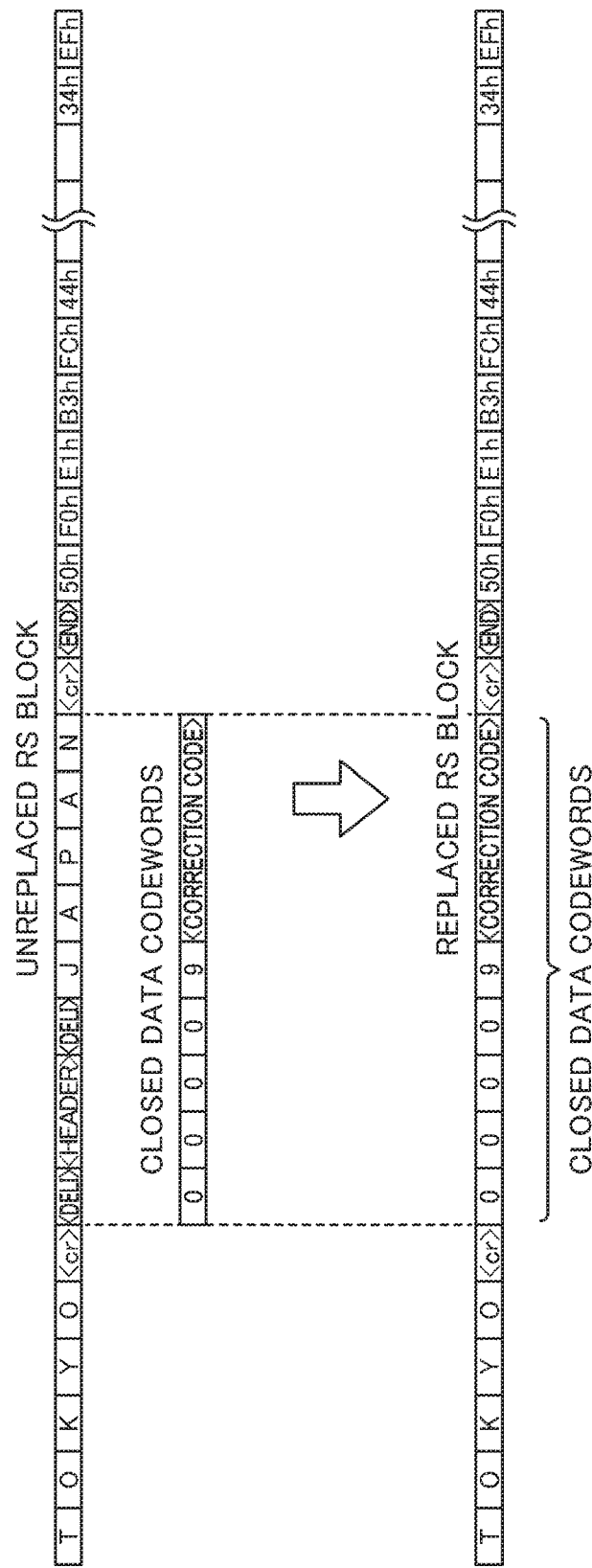
FIG. 25 is a diagram illustrating how to replace a part of a RS block in a procedure according to the fourth manner using closed data codewords.

FIG. 25 is a diagram illustrating how to replace a part of a RS block in a procedure according to the fourth manner using closed data codewords. FIG. 25 shows an unreplaced RS block, closed data codewords and a replaced RS block.

In the fourth manner, the original data of the unreplaced RS block contains header data codewords. Delimiters (each indicated as "<deli>" in FIG. 29) are placed adjacent to the header data codewords on both sides of the header data codewords. These delimiters separate information to be displayed and the header data codewords in the original data.

In order to generate the foregoing unreplaced RS block, in the fourth manner, the enhanced encoder 10 generates original data, which includes information to be displayed, header data codewords, and delimiters. The header data codewords contain the placement information of closed data codewords. The enhanced encoder 10 generates the correction codewords based on the original data composed of them (including padding codewords, if any). And, the enhanced encoder 10 generates the unreplaced RS block.

Next, the enhanced encoder 10 replaces a part of the unreplaced RS block with the closed data codewords. The replacement positions are positions corresponding to the placement information, which is contained in the header data codewords. The enhanced encoder 10 generates the replaced RS block. Subsequently, the enhanced encoder 10 generates a QR code symbol based on the replaced RS block.

Next, a decoding procedure will be described. The enhanced decoder 20 according to the fourth manner reads a QR code symbol generated as mentioned above, and expands a replaced RS block. Then, the enhanced decoder 20 corrects the replaced RS block based on the correction-code words which are included in the unreplaced RS block, and thereby an unreplaced RS block can be acquired. The unreplaced RS block includes the header data codewords separated by the delimiters, as mentioned above. The enhanced decoder 20 locates the positions of the closed data codewords and extracts the closed data codewords from the replaced RS block based on the placement information, the placement information being included in the header data codewords. The extracted closed data codewords may be corrected using the correction-code words which are included in the closed data codewords.

Header data codewords, which contain the placement information of closed data codewords, are replaced with closed data codewords as mentioned above, and the replaced RS block is consequently generated. This makes it difficult to locate the positions of closed data codewords in the replaced RS block. This can make it more difficult for a third party to extract closed data codewords.

In the fourth manner, concerning whether the read QR code symbol is a common QR code symbol or not, the judgment can be made based on whether or not the unreplaced RS block which has been read-out includes header data codewords. That is, since the unreplaced RS block according to the fourth manner includes header data codewords, the enhanced decoder 20 can display closed data codewords. On the other hand, since a common QR code symbol does not include header data codewords, the enhanced decoder 20 can display only information to be displayed without displaying the closed data codewords.

<Fifth Manner Using Closed Data Codewords>

Figure 26:
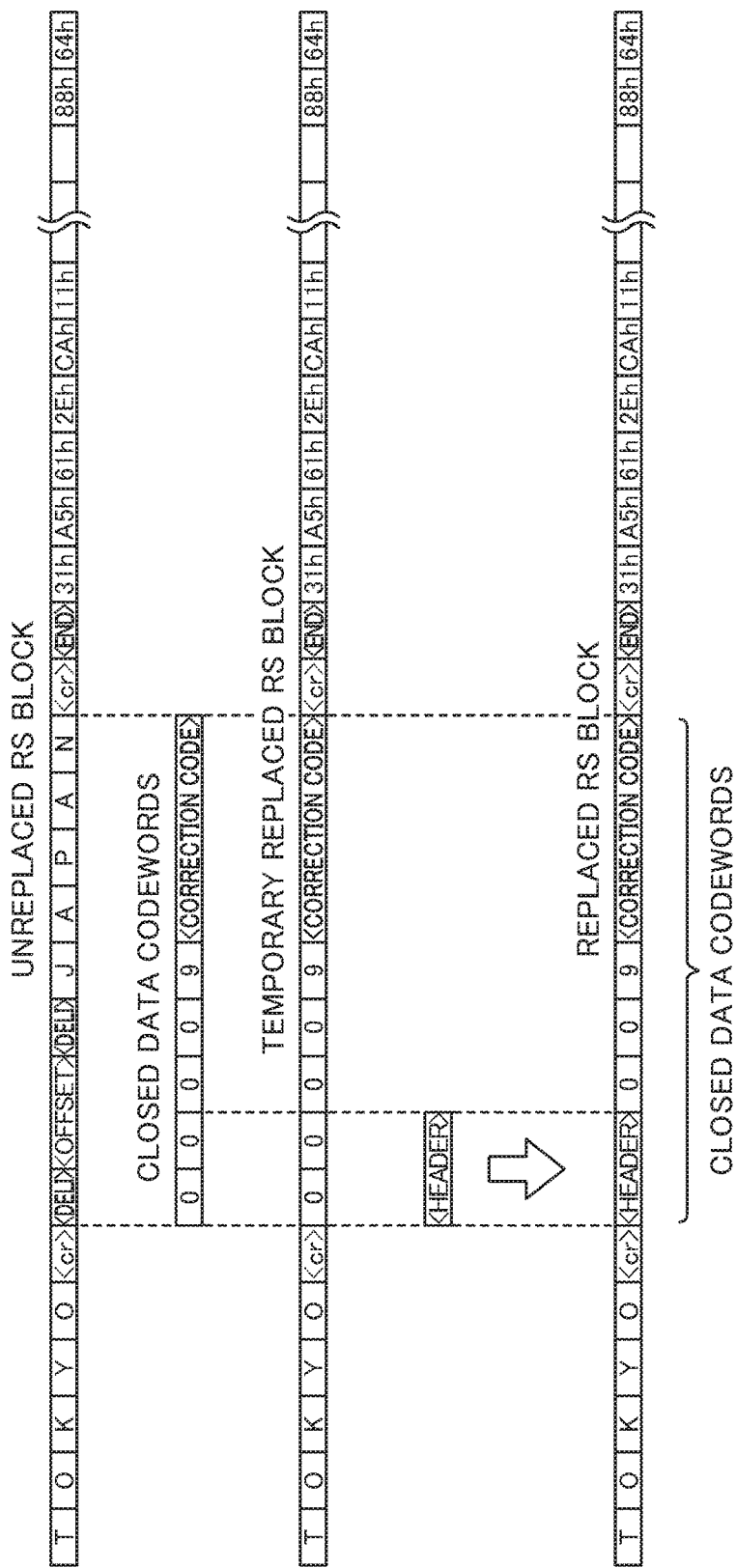
FIG. 26 is a diagram illustrating how to replace a part of a RS block in a procedure according to the fifth manner using closed data codewords.

FIG. 26 is a diagram illustrating how to replace a part of a RS block in a procedure according to the fifth manner using closed data codewords. FIG. 26 shows an unreplaced RS block, closed data codewords, header data codewords and a replaced RS block.

In the fifth manner, the original data of the unreplaced RS block contains header-offset-position-information words, which contain the position information of header data codewords (indicated as "<OFFSET>" in FIG. 26). Delimiters are respectively placed adjacent to the header-offset-position-information words on both sides of the header-offset-position-information words. These delimiters separate information to be displayed and the header-offset-position-information words in the original data.

In order to generate the foregoing unreplaced RS block, in the fifth manner, the enhanced encoder 10 generates original data, which includes information to be displayed, header-offset-position-information words, and delimiters. The enhanced encoder 10 generates the correction codewords based on the original data composed of them (including padding codewords, if any). And, the enhanced encoder 10 generates the unreplaced RS block.

Next, the enhanced encoder 10 replaces a part of an unreplaced RS block with closed data codewords. The replacement positions are positions corresponding to the placement information of the closed data codewords, the placement information being contained in the header data codewords. In this example, the placement information of closed data codewords contains information that replacement with the closed data codewords starts at the 7th word of the RS block, and that the length of the closed data codewords is 9 words. And, the enhanced encoder 10 generates a temporary replaced RS block.

Next, the enhanced encoder 10 replaces with the header data codewords a part of the closed data codewords in the temporary replaced RS block. The replacement positions are positions corresponding to the position information of the header data codewords, the position information being contained in the header-offset-position-information words. In this example, the header-offset-position-information words contain information that replacement is performed from the seventh word of the RS block. The length of the header data codewords is set to two words in advance. Based on these pieces of information, the enhanced encoder 10 replaces the RS block with the header data codewords, and the enhanced encoder 10 generates the replaced RS block. Subsequently, the enhanced encoder 10 generates a QR code symbol based on the replaced RS block.

Next, a decoding procedure will be described. The enhanced decoder 20 according to the fifth manner reads a QR code symbol generated as mentioned above, and expands a replaced RS block. Then, the enhanced decoder 20 corrects the replaced RS block based on correction-code words which are included in the RS block, and thereby an unreplaced RS block can be acquired. The unreplaced RS block includes the header-offset-position-information words separated by the delimiters, as mentioned above.

Based on the header-offset-position-information words, the enhanced decoder 20 locates the positions of the header data codewords in the replaced RS block. The enhanced decoder 20 reads-out the header data codewords from the located positions in the replaced RS block, and thereby the placement information of the closed data codeword can be acquired.

The enhanced decoder 20 extracts the closed data codewords from the replaced RS block based on the placement information of the closed data codewords. However, a part of the closed data codewords is replaced with the header data codewords. Accordingly, the enhanced decoder 20 performs correction based on the correction-code words, the correction-code words being contained in the closed data codewords. Consequently, the closed data codewords before being replaced with the header data codewords can be acquired. This makes it possible to acquire appropriately closed data codewords.

Further, the enhanced decoder 20 acquires information words which are obtained by removing the header-offset-position-information words and delimiters from the original data of the unreplaced RS block.

Thus, the header-offset-position-information words, which indicate the positions of the header data codewords, are contained in the original data. In addition, the header-offset-position-information words are replaced with the closed data codewords. These make it more difficult to locate the positions of the closed data codewords. Accordingly, it can be more difficult for a third party to extract the closed data codewords.

As in the foregoing second manner, any positions in the RS block may be replaced with the closed data codewords based on the placement information of the closed data codewords, the placement information being contained the header data codewords. In addition, the RS block may be replaced with the closed data codewords which are divided into multiple parts. It is possible to encrypt or interleave the closed data codewords, based on information of the header data codewords.

Though the positions of the header data codewords is located based on "offset", the positions of the header data codewords may be located in another procedure.

In the fifth manner, as in the second manner, concerning whether the read QR code symbol is a common QR code symbol or not, the judgment can be made based on whether or not the extracted closed data codewords include header data codewords. That is, since a QR code symbol according to the fifth manner contains header data codewords, the enhanced decoder 20 can display closed data codewords. On the other hand, since a common QR code symbol does not contain header data codewords, the enhanced decoder 20 can display only information to be displayed without displaying the closed data codewords.

<Sixth Manner Using Closed Data Codewords>

Figure 27:
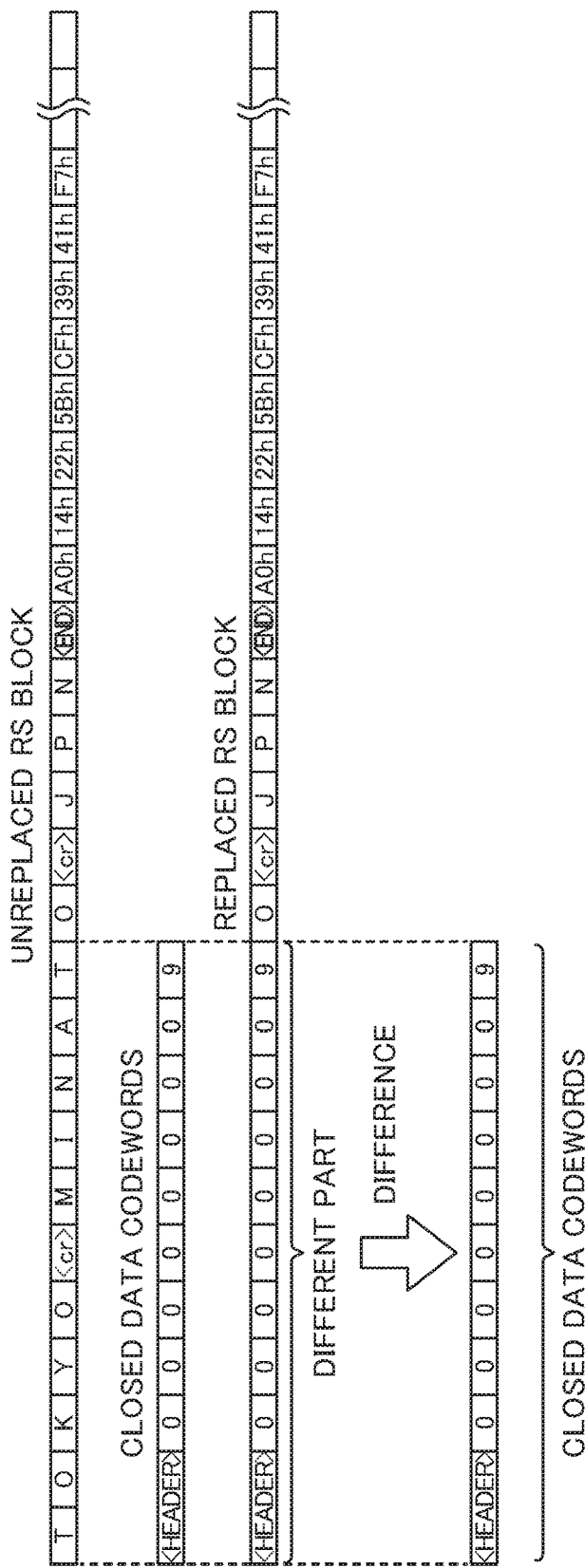
FIG. 27 is a first diagram illustrating how to replace a part of a RS block in a procedure according to the sixth manner using closed data codewords.

FIG. 27 is a first diagram illustrating how to replace a part of a RS block in a procedure according to the sixth manner using closed data codewords. FIG. 27 shows an unreplaced RS block, closed data codewords and a replaced RS block.

In the sixth manner, the enhanced encoder 10 generates the correction codewords based on original data (including padding codewords, if any). And, the enhanced encoder 10 generates the unreplaced RS block. Next, the enhanced encoder 10 replaces a part of the unreplaced RS block with the closed data codewords. Then, the enhanced encoder 10 generates the replaced RS block, and generates a QR code symbol based on the replaced RS block. Thus, in the sixth manner, a method for generating a QR code symbol has almost the same procedure as in the first manner.

Next, a decoding procedure will be described. The enhanced decoder 20 according to the sixth manner reads the QR code symbol generated as mentioned above, and expands the replaced RS block. The enhanced decoder 20 corrects the replaced RS block based on the correction-code words, which is included in the RS block, and thereby the unreplaced RS block is acquired.

The enhanced decoder 20 compares the unreplaced RS block with the replaced RS block. Then, the enhanced decoder 20 reads-out a part of the replaced RS block, the part being different from the unreplaced RS block. The information words which have been read-out as mentioned above serve as the closed data codewords. The original data is read-out from the unreplaced RS block. Since a terminator is placed in the unreplaced RS block between the original data and the correction-code words, the decoder 20 can separate the original data and the correction-code words according to the terminator.

This makes it possible to read-out the closed data codewords and the original data. With the sixth manner, it is sufficient that a comparison is merely made between the unreplaced RS block and the replaced RS block to read-out a part having a difference. Accordingly, it is not advantageously necessary to provide the placement information of the closed data codewords. That is, if the header data codewords are used, the number of the header data codewords can decrease.

Figure 28:
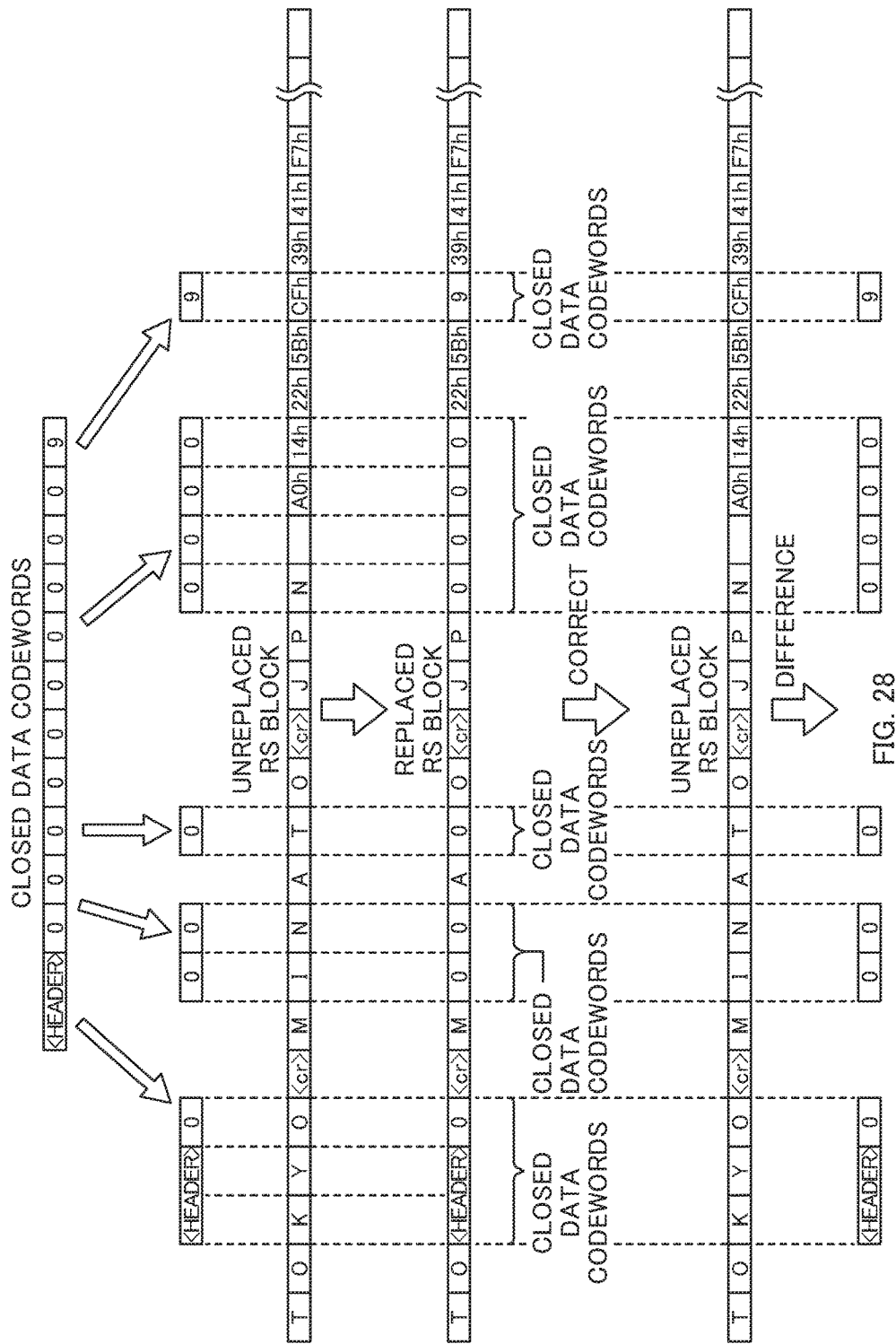
FIG. 28 is a second diagram illustrating how to replace a part of a RS block in a procedure according to the sixth manner using closed data codewords.

FIG. 28 is a second diagram illustrating how to replace a part of a RS block in a procedure according to the sixth manner using closed data codewords. In this example, parts of a RS block are replaced with closed data codewords which are divided into multiple parts.

For example, as shown in FIG. 28, the closed data codewords can be divided into five parts and parts of RS block can be replaced with them. In this case, since the number of the closed data codewords is smaller than the number of words which can be corrected with the RS code, it is possible to appropriately acquire the unreplaced RS block by performing correction. In this case, it is possible to acquire the closed data codewords by obtaining the difference between the unreplaced RS block and the replaced RS block. And, the original data can be acquired by reading-out data words from the positions in the unreplaced RS block, which are identified in advance.

The foregoing procedure in which the closed data codewords are extracted based on the difference is effective, in particular, in cases in which a QR code symbol and its RS blocks are less likely to be contaminated. For example, in cases in which an image data file of a QR code symbol is generated and then the file is retrieved to read-out closed data codewords, the QR code symbol will not be contaminated because there is no chance that the QR code symbol is exposed outside.

The foregoing procedure has an advantage that closed data codewords can be identified without providing a header data codeword or the like. This makes it possible to replace a RS block with more closed data codewords.

As in the first manner, the codewords which have been read as closed data codewords are judged whether or not they are closed data codewords as follow. If the ratio of difference between a RS block before correction and a RS block after correction exceeds a predetermined value, it can be judged that the codewords which have been read are closed data codewords (that is, it can be judged that the QR code symbol is a QR code symbol according to the sixth manner). If the ratio of difference does not exceed the predetermined value, it can be judged that the codewords are not closed data codewords (that is, it can be judged that the QR code symbol is a common QR code symbol), and it is possible not to display closed data codewords. This is because the ratio of difference between an unreplaced RS block and a replaced RS block always exceeds a predetermined value if replacement with closed data codewords is performed.

If decoding is performed based on the difference in the foregoing procedure, there is a problem that a part of an unreplaced data block will not be read-out as a difference, which is accidentally identical to a part of a replaced data block which has been replaced with closed data codewords (but, this is extremely rare). In this case, it is assumed that the words contained in header data codewords and in closed data codewords are always replaced without being separated.

Figure 29:
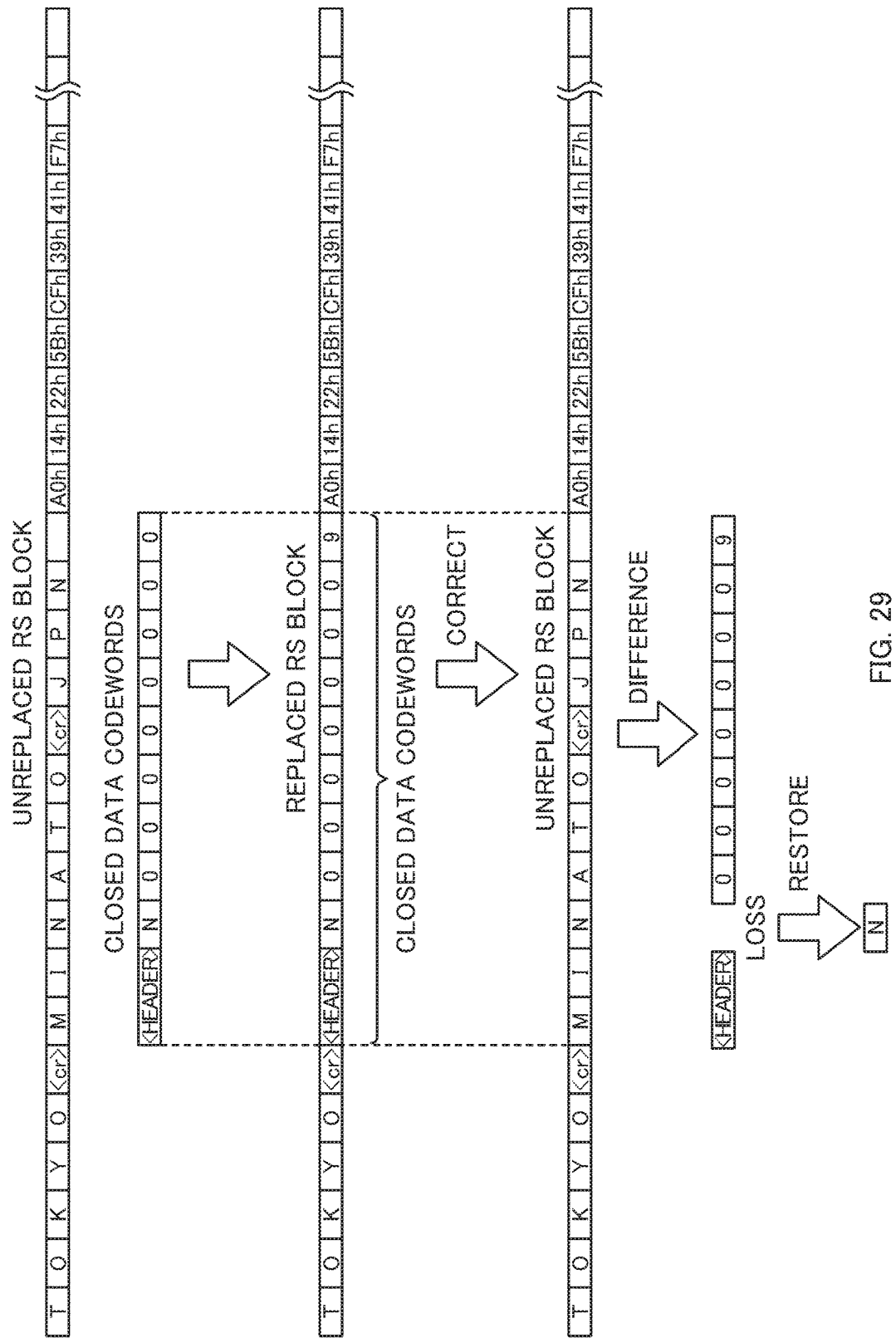
FIG. 29 is a third diagram illustrating how to replace a part of a RS block in a procedure according to the sixth manner using closed data codewords.

FIG. 29 is a third diagram illustrating how to replace a part of a RS block in a procedure according to the sixth manner using closed data codewords. In this example, the rule that the header data codewords and the closed data codewords are placed continuously is applied. Because of this rule, these words are always replaced continuously. Accordingly, even if accidentally-identical words are lost, the information can be restored by filling the lost part with the accidentally-identical words.

It is sufficient that, if codewords which are located at positions except for the ends of a RS block are lost, the lost parts are filled with the data codewords which are located at corresponding positions. However, if codewords which are located at an end of a RS block are lost, it is difficult to identify whether the loss has occurred at the initial end or at the final end. In this case, several restorations are performed for the end and are verified, as to be mentioned below.

Figure 30:
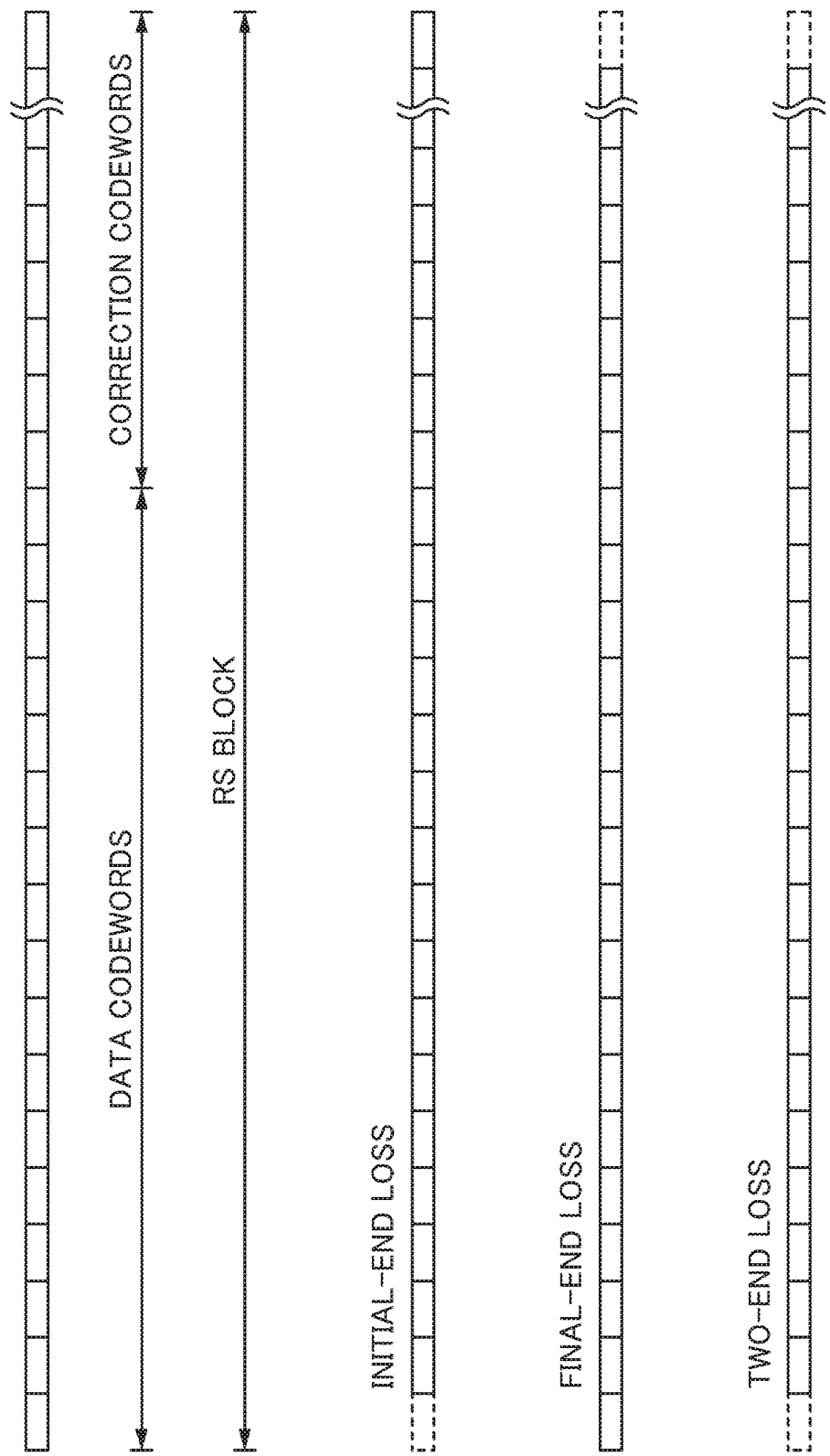
FIG. 30 is a diagram illustrating RS blocks having a data loss.

FIG. 30 is a diagram illustrating RS blocks a part of which is lost. FIG. 30 shows the following four types of RS blocks: a RS block without any loss; a RS block having a loss at the initial end of the data codewords (hereinafter referred to as an initial-end-loss RS block); a RS block having a loss at the final end of correction codewords (hereinafter referred to as a final-end-loss RS block); and a RS block having losses at both ends (hereinafter referred to as a two-end-loss RS block). For the purpose of explanation, there is no codeword in each cell. In these figures, the lost codewords are indicated by dashed lines. Thus, concerning the cases in which loss occurs at an end or ends of a RS block, there are three types.

For the initial end and the final end of such a RS block, there are possible combinations of restoration patterns. All restoration combinations are performed and are verified as follow: (1) whether correction can be processed for the restored RS block and (2) if the correction is processed, whether a result of the correction has a correct block syntax.

Figure 31:
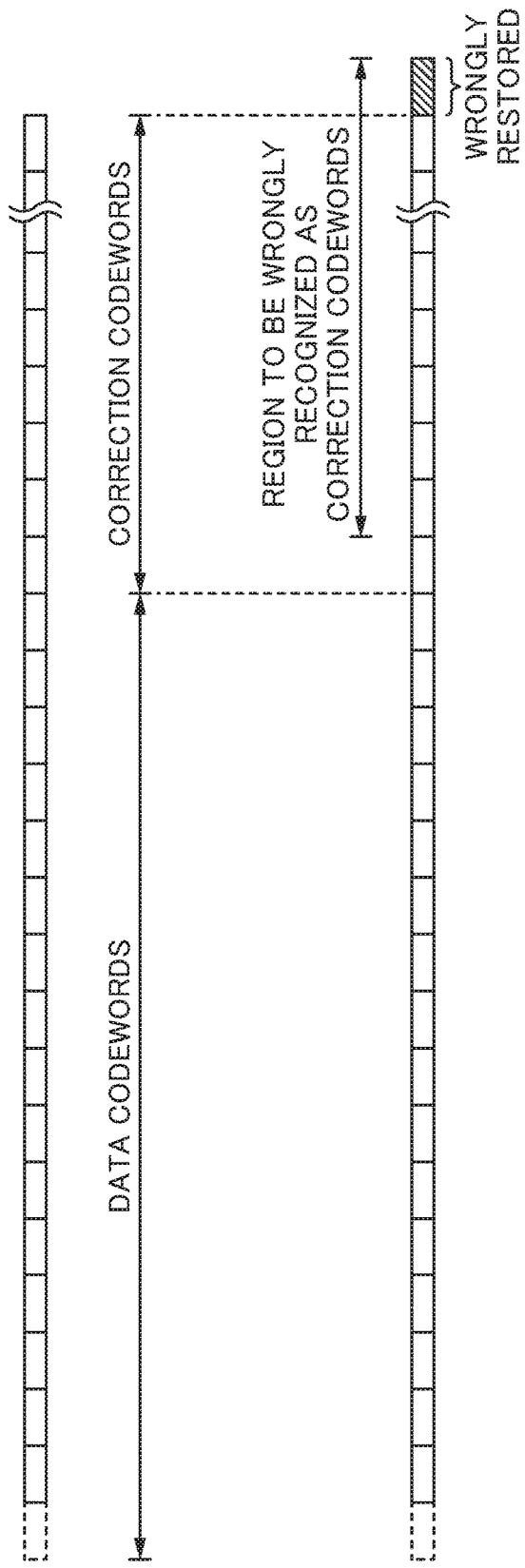
FIG. 31 is a diagram illustrating how to restore an initial-end-loss RS block.

FIG. 31 is a diagram illustrating how to restore an initial-end-loss RS block. FIG. 31 shows the initial-end-loss RS block which is wrongly restored. In the initial-end-loss RS block, the initial end of the RS block should be restored. But, from appearance of a RS block having a loss, it cannot be judged that whether the loss occurs at the initial end or at the final end. Accordingly, a RS block whose initial end is restored is generated, and also a RS block whose final end is restored is generated. These two RS blocks which have been restored will undergo correction using correction codewords.

Since the RS block whose initial end is restored is a correct RS block, correction is appropriately processed, and a result of the correction has a correct block syntax.

On the other hand, as shown in FIG. 31, in a RS block whose final end is restored, the positions of correction codewords are estimated based on the expected length of words. As a result, the wrong positions are identified as the positions of correction codewords. Correction is performed based on the codewords in a region which is wrongly recognized as correction codewords in the foregoing way. Accordingly, correction is not appropriately processed.

In this example, it is assumed that a loss of one codeword occurs. But, if a plurality of codewords are lost, the wrong positions are identified as the positions of correction codewords. Accordingly, correction is not appropriately processed.

Figure 32:
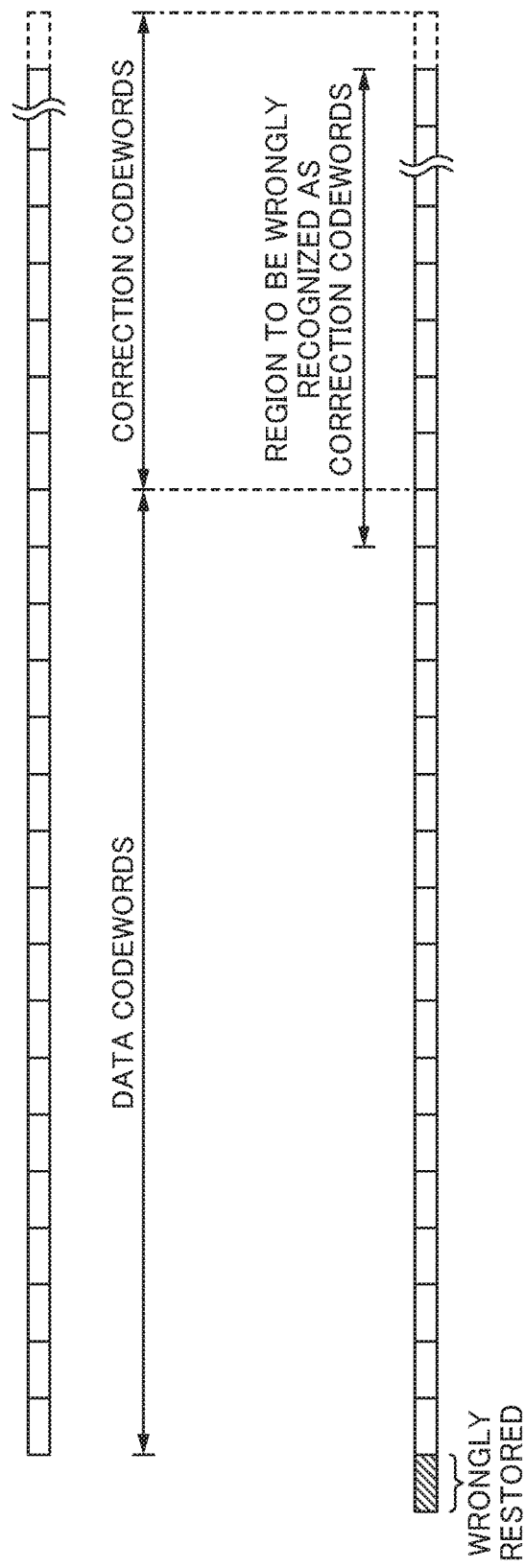
FIG. 32 is a diagram illustrating how to restore a final-end-loss RS block.

FIG. 32 is a diagram illustrating how to restore the final-end-loss RS block. FIG. 32 shows the final-end-loss RS block which is wrongly restored. In the final-end-loss RS block, the final end of the RS block should be restored. But, from appearance of a RS block having a loss, it cannot be judged that whether the loss occurs at the initial end or at the final end. Also in this case, a RS block whose initial end is restored is generated, and a RS block whose final end is restored is generated. These two RS blocks which have been restored will undergo correction using correction codewords.

Since the RS block whose final end is restored a correct RS block, correction is appropriately processed, and a result of the correction has a correct block syntax.

On the other hand, as shown in FIG. 32, in a RS block whose initial end is restored, the positions of correction codewords are estimated based on the expected length of words. As a result, the wrong positions are identified as the positions of correction codewords. Correction is performed based on the codewords in a region which is wrongly recognized as correction codewords in the foregoing way. Accordingly, correction is not appropriately processed.

In this example, it is assumed that a loss of one codeword occurs. But, if a plurality of codewords are lost, the wrong positions are identified as the positions of correction codewords. Accordingly, correction is not appropriately processed.

Figure 33:
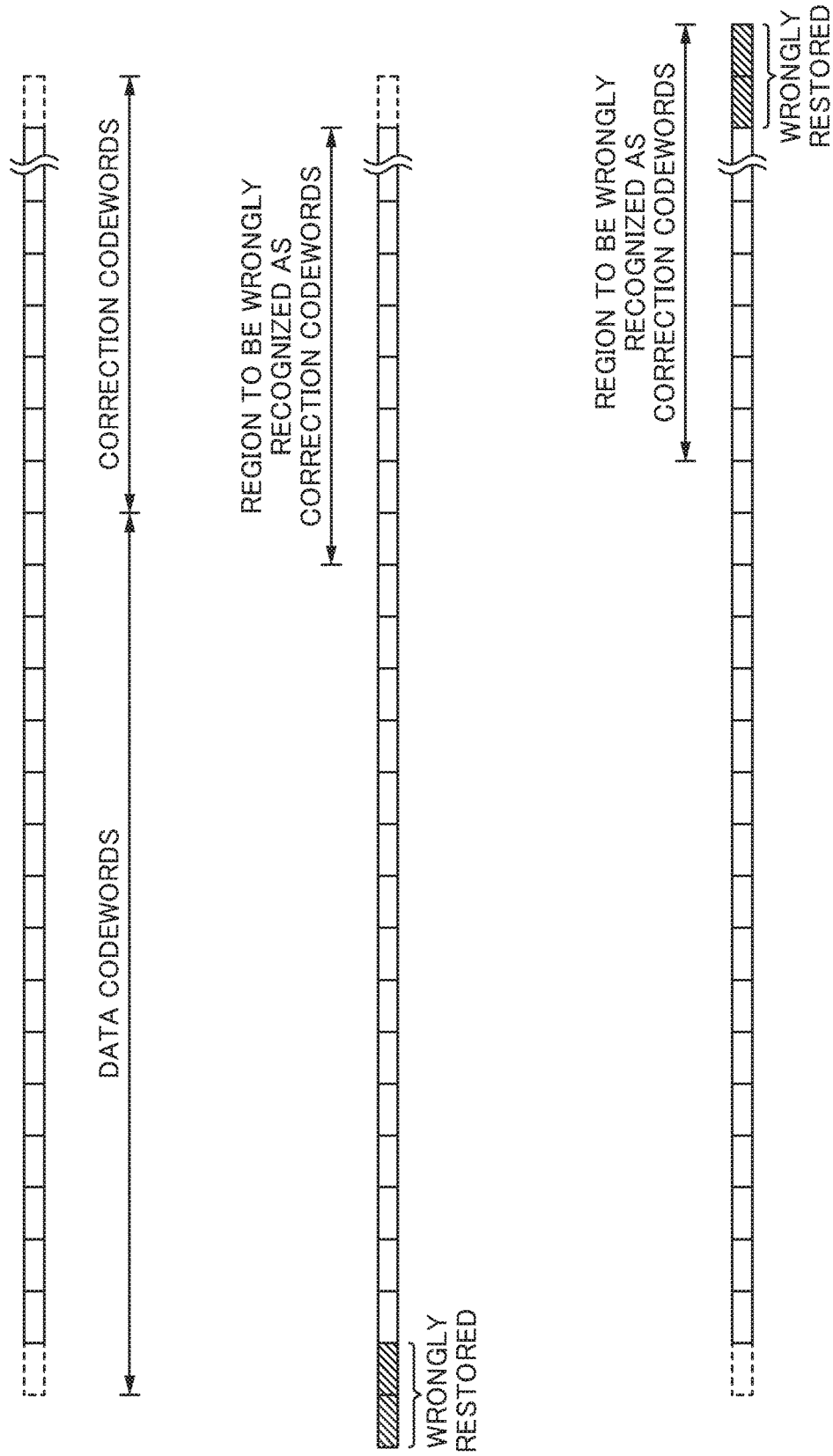
FIG. 33 is a diagram illustrating how to restore a two-end-loss RS block.

FIG. 33 is a diagram illustrating how to restore the two-end-loss RS block. FIG. 33 shows two-end-loss RS blocks which are wrongly restored. In this example, it is assumed that a loss of one codeword occurs at each end. In the two-end-loss RS block of these types, each of one-word losses at the initial end and at the final end should be restored. But, also in this case, from appearance of a RS block having losses, it cannot be judged how the loss occurs.

Accordingly, in this case, the following RS blocks are generated: a RS block in which two words at the initial end are restored; a RS block in which two words at the final end are restored; and a RS block in which two words respectively located at the initial and final ends are restored. For each of the restored RS blocks, correction is performed using a correcting block. A method for verification, which is subsequently performed, is the same as in a case in which the initial-end-loss RS block is restored and as in a case in which the final-end-loss RS block is restored. The description thereof will therefore be omitted.

As mentioned above, by restoring in all possible patterns and verifying the restoring, it is possible to acquire a RS block which has been appropriately restored.

In this example, though the foregoing three types of the cases are described, the number of times of verifications changes depending on the number of lost data codewords.

For example, if one data codeword is lost as mentioned above, there are two possible cases: a case in which one codeword at the initial end is lost; and a case in which one codeword at the final end is lost.

If two data codewords are lost, there are three possible cases: a case in which two codewords at the initial end are lost; a case in which two codewords at the initial end are lost and one codeword at the final end is lost; and a case in which two codewords at the final end are lost.

If three data codewords are lost, there are four possible cases: a case in which three data codewords at the initial end are lost; a case in which two codewords at the initial end are lost and one codeword at the final end is lost; a case in which one codeword at the initial end is lost and two codewords at the final end are lost; a case in which three data codewords at the final end are lost.

According to this regularity, if N codewords are lost at the ends in total, (N+1) types of verifications are performed. As a result of (N+1) types of verifications, it is possible to employ a RS block which has been appropriately corrected.

Thus, even if a case in which loss occurs at the initial end or at the final end, it is possible to appropriately restore the correct RS block by generating and verifying RS blocks which have been restored corresponding to the case. There is extremely rarely possible that a RS block which has been wrongly restored is corrected without trouble. In this case, however, the corrected block has a problem such that it is not satisfy the predetermined format. Accordingly, based on this, it can be judged that the block is not appropriately restored.

<Seventh Manner Using Closed Data Codewords>

In the seventh manner using closed data codewords, when an unreplaced RS block is replaced with closed data codewords, the replacement position is identified based on the foregoing mask pattern reference MPR.

In the seventh manner using closed data codewords, an unreplaced RS block is replaced with closed data codewords, and this point is the same as in the first manner using closed data codewords. But, in the seventh manner, the replacement position changes based on a mask pattern reference MPR. Since a mask pattern reference MPR is thus used for identifying the replacement position of the closed data codewords, it is more difficult for a third party to extract the closed data codewords.

To use a mask pattern reference MPR is a same point as of the first embodiment. And, a method for generating an enhanced QR code will be described with reference to FIG. 4 in the first embodiment.

In this example, the difference from the first embodiment is that, between step S110 and step S112, replacement with closed data codewords is performed at a position determined based on the mask pattern reference MPR. Specifically, the replacement with the closed data codewords is performed at the positions (replacement positions) which the mask pattern reference MPR locates. In this example, the replacement with the closed data codewords is performed from the position which is of the word corresponding to the mask pattern reference MPR from the initial word of the unreplaced RS block. For example, if the value of the mask pattern reference is "0", the unreplaced RS block is replaced from its initial word with the closed data codewords. As mentioned above, the value of the mask pattern reference MPR ranges from 0 to 7. Accordingly, the mask pattern reference MPR can identify 8 types of positions as the replacement position of the closed data codewords.

Figure 34:
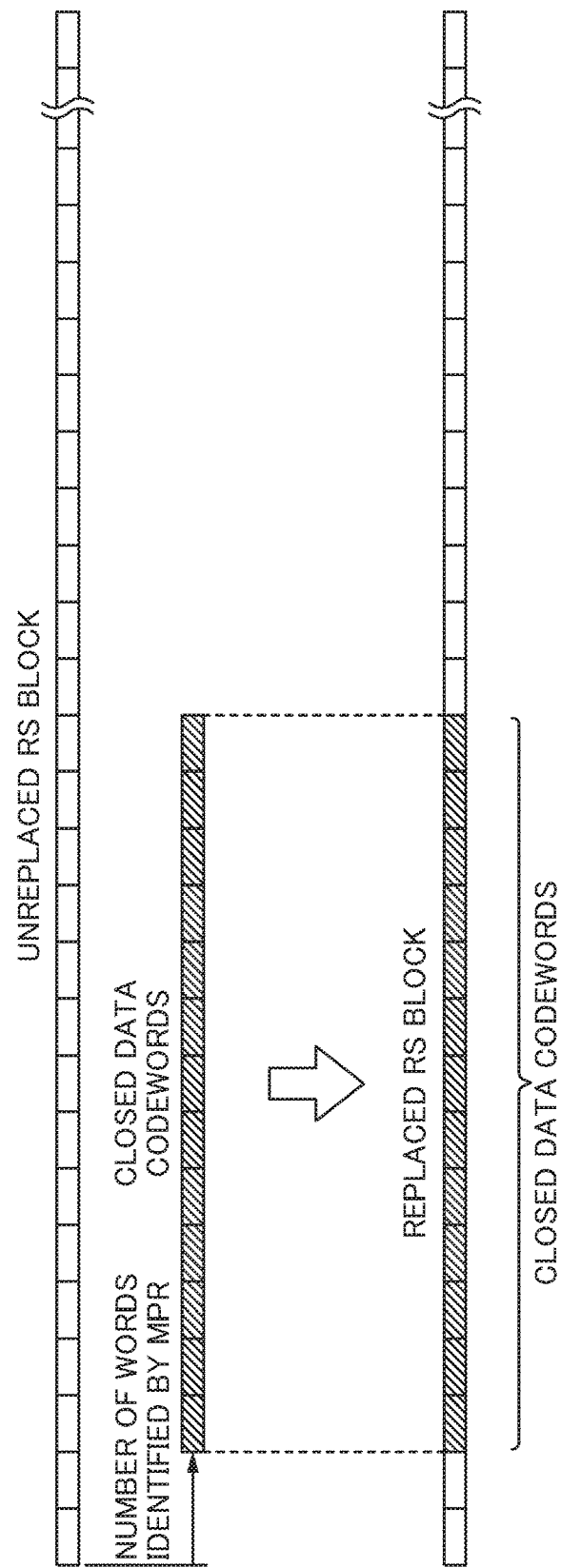
FIG. 34 is a diagram illustrating how to replace a part of a RS block in a procedure according to the seventh manner using closed data codewords.

FIG. 34 is a diagram illustrating a procedure for replacing a part of a RS block in the seventh manner using closed data codewords. FIG. 34 shows a case in which the value of the mask pattern reference MPR is "2" and in which the unreplaced RS block is replaced with the closed data codewords at a position offset by third words from the start of the unreplaced RS block (since "0" replaces from the first word, replacement from (MPR+1)$^{th}$ word).

There is a procedure in which the replacement positions with closed data codewords is positions which are of the words corresponding to the value of mask pattern reference MPR, and the procedure is one of the simplest procedure for locating the replacement positions by the mask pattern reference MPR. However, the embodiment is not limited thereto. The replacement positions may be identified based on a position which is predetermined according to the value of the mask pattern reference MPR.

The subsequent processes are the same as in the first embodiment, and the description thereof will be omitted.

Accordingly, the mask pattern reference MPR is used to locate a position of the RS block which is replaced with closed data codewords. Since there are 8 types of the standard mask patterns, the value of the mask pattern reference MPR can have 8 types of numbers. Depending on the applied standard mask pattern, it is therefore possible to change the replacement positions of the closed data codewords. This makes it difficult for a third party to locate the positions of the closed data codewords, and therefore it can be further difficult to extract the closed data codewords.

In the seventh manner using closed data codewords, until the evaluation in step S122 is conducted on all of the QR code symbols generated using different values of the mask pattern reference MPRs from 0 to 7, it is impossible to determine the optimal QR code symbol among the QR code symbols having closed data codewords at different positions. Accordingly, until the evaluation in step S122, it is impossible to determine which QR code symbol is employed among the QR code symbols in which replacement with closed data codewords are conducted at different positions. Thus, since the replacement position with closed data codewords cannot be determined in advance, it is difficult to identify the position of the closed data codewords. Accordingly, it can be further difficult to extract the closed data codewords.

Next, a method for reading an enhanced QR code will be described with reference to FIG. 7 in the first embodiment.

In this example, the difference from the first embodiment is that, between step S212 and step S214, closed data codewords are extracted at a position determined according to the mask pattern reference MPR. In this example, as mentioned above, the closed data codewords are extracted from the replaced RS block at a position offset by the number of words of the mask pattern reference MPR.

This makes it possible to appropriately extract the closed data codewords based on the mask pattern reference MPR.

As mentioned above, the positions of the closed data codewords are defined based on the mask pattern reference MPR. Also, the positions of the closed data codewords may be defined using the version information of a QR code symbol. The version of the QR codes ranges from version 1 to version 40 in JIS. Accordingly, based on the combination of 8 types of the mask pattern reference MPRs and 40 types of the versions, the positions of the closed data codewords can be determined in a different manner of 320 types in total.

In addition to the foregoing combination, the information of the error correction level of the QR code symbol may be combined. In JIS, there are four error correction levels: "level L", "level M", "level Q", and "level H". Accordingly, based on the additional combination with these four types, the positions of the closed data codewords can be determined in a different manner of 1280 types in total.

In this example, closed data codewords are replaced continuously from the identified position. But, closed data codewords may be replaced separately as in the FIG. 19.

In the foregoing description, in order to identify the replacement position with closed data codewords, the mask pattern reference MPR is used. But, it is also acceptable that, by introducing the concept of the foregoing second manner using closed data codewords, the position of the header data codewords is identified using the foregoing mask pattern reference MPR. This makes it difficult for a third party to identify the position of the header data codewords. Since the position of the closed data codewords is identified using the header data codewords, it is more difficult to extract the closed data codewords.

<Eighth Manner Using Closed Data Codewords>

In the eighth manner using closed data codewords, when an unreplaced RS block is replaced with closed data codewords, positions at which replacement is performed are identified based on correction codewords (a RS code).

In the eighth manner using closed data codewords, an unreplaced RS block is replaced with closed data codewords, and this point is the same as in the first manner using closed data codewords. But, in the eighth manner, the replacement position changes based on correction codewords.

Figure 35:
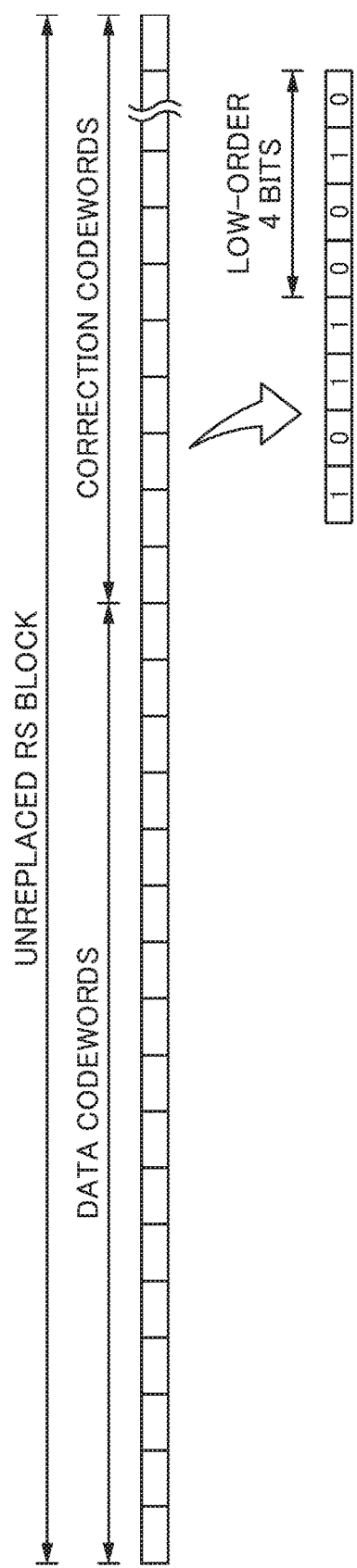
FIG. 35 is a first diagram illustrating how to replace a part of a RS block in a procedure according to the eighth manner using closed data codewords.

FIG. 35 is a first diagram illustrating how to replace a part of a RS block in the eighth manner using closed data codewords. FIG. 35 shows an unreplaced RS block. In the eighth manner, the replacement positions with the closed data codewords are identified based on multiple bits of a specific byte in the correction codewords. Specifically speaking, in this example, the third byte of the correction codewords is extracted, and low-order 4 bits are extracted from the byte. The replacement positions with the closed data codewords are indicated by the values of these low-order 4 bits. FIG. 35 shows the digits "0010" as information of the low-order 4 bits. The digits "0010" mean "2" in decimal form. But, in this example, since "0" means a first position, "0010" means the third position from the initial word. Next, replacement with closed data codewords is performed based on the replacement positions.

Figure 36:
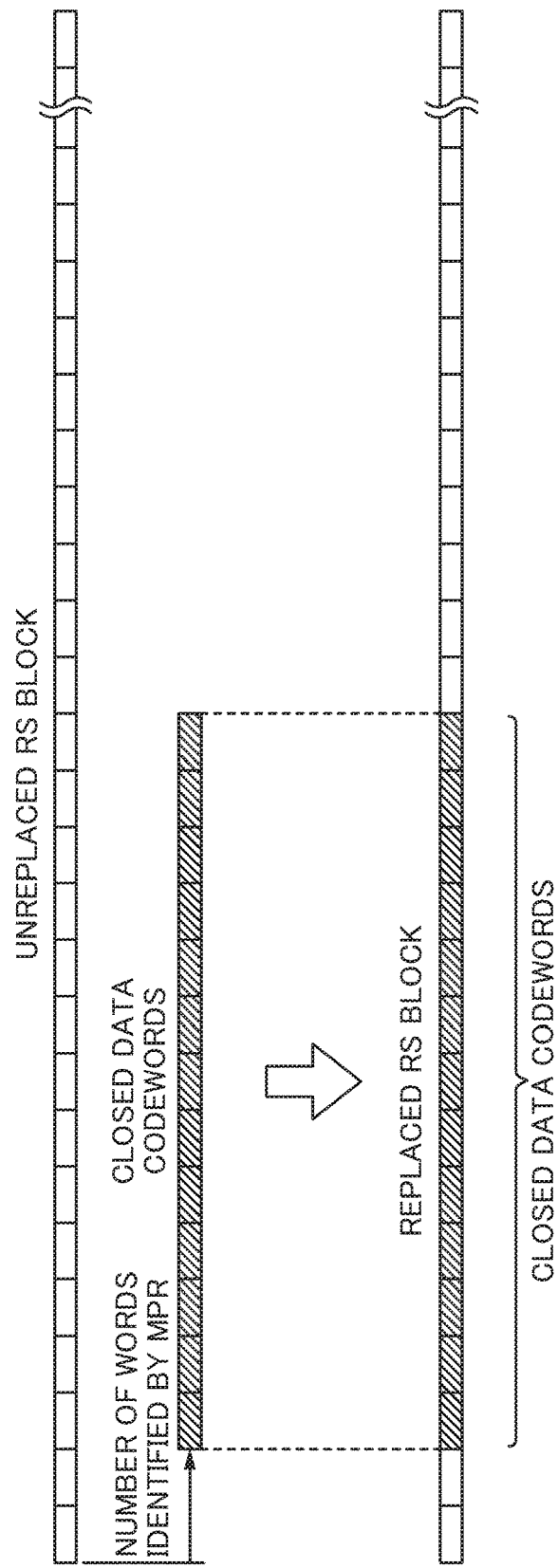
FIG. 36 is a second diagram illustrating how to replace a part of a RS block in a procedure according to the eighth manner using closed data codewords.

FIG. 36 is a second diagram illustrating how to replace a part of a RS block in the eighth manner using closed data codewords. FIG. 36 shows replacement with the closed data codewords from the position which is of the third byte (the position of the third word) from the initial word of the unreplaced RS block. As mentioned above, the replacement positions of the closed data codewords are identified based on the correction codewords, and replacement with the closed data codewords is performed.

The correction codewords are obtained based on the data codewords. Accordingly, if the data codewords are different, the correction codewords are also different. That is, when the replacement positions are identified based on the correction codewords, if data codewords are different, the replacement positions are also different. This makes it difficult for a third party to locate the positions of the closed data codewords, and therefore it can be further difficult to extract the closed data codewords.

In reading process of a QR code symbol, the replacement positions with the closed data codewords in the replaced RS block are identified based on a bit of a specific byte in the correction codewords. In this example, the third byte of the correction codeword is extracted as mentioned above, and low-order 4 bits are extracted from the byte. The replacement positions with the closed data codewords are identified based on the values of these low-order 4 bits. This makes it possible to appropriately identify the positions of the closed data codewords and to extract the closed data codewords.

When the replaced RS block is subsequently corrected using the correction codewords, the data codewords can be appropriately extracted.

When a part of the unreplaced RS block is replaced with closed data codewords, there is a possibility that the bytes of the correction codewords for identifying the replacement position are replaced. In this case, the replaced RS block may be corrected in advance using the correction codewords. Since this makes it possible to acquire the unreplaced RS block, it is possible to appropriately extract the bytes of the correction codewords for identifying the replacement position.

In the foregoing description, the third byte of the correction codewords is used. No matter of course, another byte of the correction codewords may be used. Using low-order 4 bits makes it possible to indicate 16 patterns of the positions, and, by using 5 or more bits, it is possible to increase the number of the positions patterns which can be indicated.

In the description above, the correction codewords are used in order to identify the replacement positions with the closed data codewords. However, a concept of the foregoing second manner using closed data codewords may be introduced, and the position of the header data codeword may be identified by the foregoing correction codewords. The error correction codewords are obtained based on the data codewords. Accordingly, if the data codewords are different, the error correction codewords are also different. That is, when the replacement positions are identified based on the error correction codewords, if data codewords are different, the replacement positions are also different. This makes it difficult for a third party to locate the positions of the header data codewords. Since the header data codewords locate the positions of closed data codewords, it can be therefore further difficult to extract the closed data codewords.

<Ninth Manner Using Closed Data Codewords>

It is possible to embed closed information in a RS block as follow.

Figure 37:
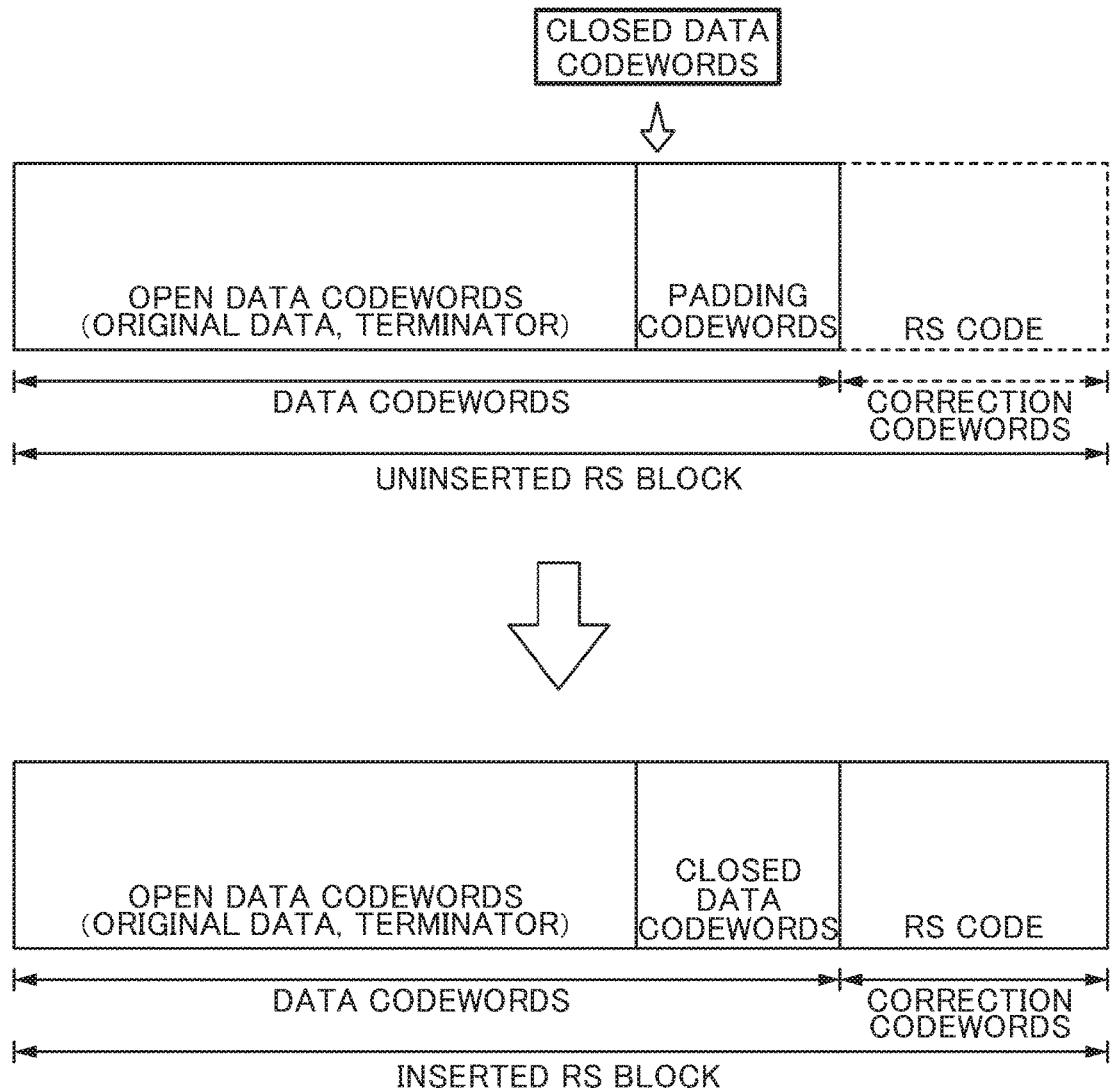
FIG. 37 is a schematic diagram of a RS block according to the ninth manner using closed data codewords.

FIG. 37 is a schematic diagram of a RS block according to the ninth manner using closed data codewords. FIG. 37 shows closed information, open data codeword (original data and a terminator), padding codewords and a RS code. However, FIG. 37 is different from the foregoing embodiments in that the padding codewords are replaced with the closed information, and in that the RS code is generated after embedding the closed information.

If the total number of the obtained data codewords in a RS block does not reach the capacity of the RS block in conformance with JIS, a terminator, which indicates the end of the codewords of original data, is placed at the end of the codewords. In addition, padding codewords which does not represent data are placed in empty positions in the codeword region (the upper figure of FIG. 37). In the ninth manner, the closed information is changed to a part or the whole of padding codes and is placed after the terminator (the lower figure of FIG. 37). Afterward, the RS code, which serves as the correction codewords, is generated.

An inserted RS block is generated in the foregoing manner (in order to clarify the difference from the "replaced RS block", it is referred to as an "inserted RS block" in this example). A common decoder neglects the inserted RS block, and the codewords after the terminator is interpreted and discarded as padding codes not presenting data. And, only the original data can be read-out. On the other hand, an enhanced decoder which supports this format can extract, as closed information, data following the terminator.

===Other Embodiments===

In the foregoing embodiment, a standard QR code and an enhanced QR code are provided as an example of a 2D barcode. However, no matter of course this invention may be applied to other types of the 2D barcode.

The above-described embodiments are merely for facilitating the understanding of the invention, but is not meant to be interpreted in a manner limiting the scope of the invention. The invention can of course be altered and improved without departing from the gist thereof, and equivalents are intended to be embraced therein.

REFERENCE SIGNS LIST 10 enhanced encoder,
11 control section,
11a operation section,
11b storage section,
13 display device,
14 printing device,
15 input device,
20 enhanced decoder, 21 control section,
21a operation section,
21b storage section,
22 imaging device,
23 display device,
24 printing device,
25 input device

The invention claimed is:

1. A method for generating a two-dimensional barcode, comprising:
   obtaining a protection-encoding pattern based on a mask pattern reference,
      the mask pattern reference being a reference for identifying a standard mask pattern that is applied to a module group,
      the module group being composed of a plurality of modules,
      each module being a unit cell constituting the two-dimensional barcode,
      the protection-encoding pattern being different from the standard mark pattern;
   obtaining a protection-encoded code block by protection-encoding a code block with the protection-encoding pattern,
      the code block having at least a data codeword;
   generating the module group based on the protection-encoded code block; and
   generating a two-dimensional barcode having the module group to which the standard mask pattern is applied.

2. A method for generating a two-dimensional barcode according to claim 1, the method further comprises:
   using different mask pattern references to generate a plurality of the two-dimensional barcodes; and
   selecting a certain two-dimensional barcode among the plurality of two-dimensional barcodes based on a predetermined evaluation.

3. A method for generating a two-dimensional barcode according to claim 1, wherein,
   the protection-encoding is a step of XORing the code block with the protection-encoding pattern on a bit-by-bit basis.

4. A method for generating a two-dimensional barcode according to claim 1, wherein
   the two-dimensional barcode is a QR code, and
   the mask pattern reference is contained in format information of the QR code.

5. A method for generating a two-dimensional barcode according to claim 1, wherein
   the code block contains a correction code that corrects the code block,
   the protection-encoding pattern is obtained based on the mask pattern reference and one other reference,
   a part of the protection-encoded code block is replaced with the other reference, and
   a correcting capacity of the correction code is equal to or more than a number of words of the other reference.

6. A method for generating a two-dimensional barcode according to claim 5, wherein
   a position which has been replaced with the other reference is identified based on the mask pattern reference.

7. A method for generating a two-dimensional barcode according to claim 1, wherein
   when the code block is partly replaced with one other reference,
      at least a part of the code block is replaced with a closed data codeword,
      at least the part being a part other than a part that has been replaced with the other reference, and
      a correcting capacity of a correction code contained in the code block is equal to or larger than a sum of a number of the closed data codewords and a number of words of the other reference.

8. A device for generating a two-dimensional barcode, comprising:
   an encoder in which:
      a protection-encoding pattern is obtained based on a mask pattern reference,
         the mask pattern reference being a reference for identifying a standard mask pattern that is applied to a module group,
         the module group being composed of a plurality of modules,
         each module being a unit cell constituting the two-dimensional barcode,
         the protection-encoding pattern being different from the standard mask pattern;
      a protection-encoded code block is obtained by protection-encoding a code block with the protection-encoding pattern,
         the code block having at least a data codeword;
      the module group is generated based on the protection-encoded code block; and
      the two-dimensional barcode having the module group to which the standard mask pattern is applied is generated.

9. A computer-readable storage medium storing a program causing a computer to perform the following processes:
   obtaining a protection-encoding pattern based on a mask pattern reference,
      the mask pattern reference being a reference for identifying a standard mask pattern that is applied to a module group,
      the module group being composed of a plurality of modules,
      each module being a unit cell constituting a two-dimensional barcode,
      the protection-encoding pattern being different from the standard mask pattern;
   obtaining a protection-encoded code block by protection-encoding a code block with the protection-encoding pattern,
      the code block having at least a data codeword;
   generating the module group based on the protection-encoded code block; and
   generating a two-dimensional barcode having the module group to which the standard mask pattern is applied.

10. A two-dimensional barcode wherein:
   a protection-encoding pattern is obtained based on a mask pattern reference,
      the mask pattern reference being a reference for identifying a standard mask pattern that is applied to a module group,
      the module group being composed of a plurality of modules,
      each module being a unit cell constituting the two-dimensional barcode,
      the protection-encoding pattern being different from the standard mask pattern;

a protection-encoded code block is obtained by protection-encoding a code block with the protection-encoding pattern,
the code block having at least a data codeword;
the module group is generated based on the protection-encoded code block; and
the two-dimensional barcode having the module group to which the standard mask pattern is applied is generated.

11. A method for reading a two-dimensional barcode, comprising:
reading a two-dimensional barcode,
the two-dimensional barcode being generated by the following steps:
obtaining a protection-encoding pattern based on a mask pattern reference,
the mask pattern reference being a reference for identifying a standard mask pattern that is applied to a module group,
the module group being composed of a plurality of modules,
each module being a unit cell constituting the two-dimensional barcode,
the protection-encoding pattern being different from the standard mask pattern;
obtaining a protection-encoded code block by protection-encoding a code block with the protection-encoding pattern,
the code block having at least a data codeword;
generating the module group based on the protection-encoded code block; and
applying the standard mask pattern to the module group;
extracting the mask pattern reference that is contained in the two-dimensional barcode;
obtaining the module group by unmasking the two-dimensional barcode using the standard mask pattern that is identified by the mask pattern reference;
obtaining the protection-encoded code block from the module group;
obtaining the code block by protection-decoding the protection-encoded code block using the protection-encoding pattern that is obtained based on the mask pattern reference; and
extracting the data codeword from the code block.

12. The method for reading a two-dimensional barcode according to claim 11, wherein
the two-dimensional barcode is a two-dimensional barcode that is selected among a plurality of two-dimensional barcodes based on a predetermined evaluation,
the plurality of two-dimensional barcodes being generated using different mask pattern references.

13. The method for reading a two-dimensional barcode according to claim 11, wherein
the protection-decoding is a step of XORing the protection-encoded code block with the protection-decoding pattern on a bit-by-bit basis.

14. The method for reading a two-dimensional barcode according to claim 11, wherein
the two-dimensional barcode is a QR code, and
the mask pattern reference is contained in format information of the QR code.

15. The method for reading a two-dimensional barcode according to claim 11, wherein
the code block contains a correction code that corrects the code block,
the protection-encoding pattern is obtained based on the mask pattern reference and one other reference,
a part of the protection-encoded code block is replaced with the other reference, and
a correcting capacity of the correction code is equal to or more than a number of words of the other reference.

16. The method for reading a two-dimensional barcode according to claim 15, wherein
a position which has been replaced with the other reference is specified based on the mask pattern reference.

17. The method for reading a two-dimensional barcode according to claim 11, wherein
when the code block is partly replaced with one other reference,
at least a part of the code block is replaced with a closed data codeword,
at least the part being a part other than a part that has been replaced with the other reference, and
a correcting capacity of a correction code contained in the code block is equal to or larger than a sum of a number of the closed data codewords and a number of words of the other reference.

18. A device for reading a two-dimensional barcode, comprising:
a decoder in which:
a two-dimensional barcode is read,
the two-dimensional barcode being generated by the following steps:
obtaining a protection-encoding pattern based on a mask pattern reference,
the mask pattern reference being a reference for identifying a standard mask pattern that is applied to a module group,
the module group being composed of a plurality of modules,
each module being a unit cell constituting the two-dimensional barcode,
the protection-encoding pattern being different from the standard mask pattern;
obtaining a protection-encoded code block by protection-encoding a code block with the protection-encoding pattern,
the code block having at least a data codeword;
generating the module group based on the protection-encoded code block; and
applying the standard mask pattern to the module group;
the mask pattern reference contained in the two-dimensional barcode is extracted;
the module group is obtained by unmasking the two-dimensional barcode using the standard mask pattern that is identified by the mask pattern reference;
the protection-encoded code block is obtained from the module group;
the code block is obtained by protection-decoding the protection-encoded code block using the protection-encoding pattern that is obtained based on the mask pattern reference; and
the data codeword is extracted from the code block.

19. A computer-readable storage medium storing a program causing a computer to perform the following processes:
reading a two-dimensional barcode,
the two-dimensional barcode being generated by the following steps:
obtaining a protection-encoding pattern based on a mask pattern reference, the mask pattern reference being a reference for identifying a standard mask pattern that is applied to a module group, the module group being composed of a plurality of modules, each module being a unit cell constituting the two-dimensional barcode, the protection-encoding pattern being different from the standard mask pattern;

obtaining a protection-encoded code block by protection-encoding a code block with the protection-encoding pattern, the code block having at least a data codeword;

generating the module group based on the protection-encoded code block; and applying the standard mask pattern to the module group;

extracting the mask pattern reference that is contained in the two-dimensional barcode;

obtaining the module group by unmasking the two-dimensional barcode using the standard mask pattern that is identified by the mask pattern reference;

obtaining the protection-encoded code block from the module group;

obtaining the code block by protection-decoding the protection-encoded code block using the protection-encoding pattern that is obtained based on the mask pattern reference; and extracting the data codeword from the code block.

* * * * *